United States Patent
Ogawa

(10) Patent No.: US 7,305,179 B2
(45) Date of Patent: Dec. 4, 2007

(54) ANTI-SHAKE APPARATUS

(75) Inventor: Takahiro Ogawa, Saitama (JP)

(73) Assignee: PENTAX Corporation, Tokyo (JP)

( * ) Notice: Subject to any disclaimer, the term of this patent is extended or adjusted under 35 U.S.C. 154(b) by 373 days.

(21) Appl. No.: 11/167,107

(22) Filed: Jun. 28, 2005

(65) Prior Publication Data

US 2006/0002693 A1  Jan. 5, 2006

(30) Foreign Application Priority Data

Jul. 1, 2004  (JP)  ............................ P2004-195239

(51) Int. Cl.
 G03B 13/00 (2006.01)
 G03B 17/00 (2006.01)
 G02B 7/28 (2006.01)
 H04N 5/46 (2006.01)
 H04N 5/228 (2006.01)

(52) U.S. Cl. .................... 396/54; 396/55; 396/111; 348/208.5; 348/218.1; 359/555; 359/557

(58) Field of Classification Search ............ 396/52–55, 396/111; 348/208.2, 208.3, 208.5, 218.1, 348/219.1, 36, 39, 511; 359/555, 557
See application file for complete search history.

(56) References Cited

U.S. PATENT DOCUMENTS

| | | | |
|---|---|---|---|
| 4,623,930 A | 11/1986 | Oshima et al. ............. | 358/222 |
| 6,639,625 B1 | 10/2003 | Ishida et al. ............. | 348/218.1 |
| 2005/0285949 A1* | 12/2005 | Ogawa et al. ......... | 348/208.99 |
| 2005/0286887 A1* | 12/2005 | Uenaka et al. .............. | 396/322 |
| 2006/0055823 A1* | 3/2006 | Kinoshita et al. ........... | 348/511 |

FOREIGN PATENT DOCUMENTS

JP  1-053957  11/1989

OTHER PUBLICATIONS

U.S. Appl. No. 11/157,806, to Uenaka et al., which was filed on Jun. 22, 2005.
English language Abstract of JP 1-053957.

* cited by examiner

Primary Examiner—Melissa Jan Koval
(74) Attorney, Agent, or Firm—Greenblum & Bernstein P.L.C.

(57) ABSTRACT

An anti-shake apparatus of a photographing apparatus comprises a movable unit, and a control apparatus. The movable unit has an imaging device, and can be moved in first and second directions. The control apparatus moves the movable unit to first, second, third, and fourth positions, and performs first, second, third, and fourth imaging operations, and a combination operation for obtaining an anti-shake image signal in which lag from hand-shake is corrected. In the first imaging operation, a first imaging position of a first photography frame in which lag corresponding to a first hand-shake quantity is corrected, is calculated, and a first image signal which is imaged at an overlapping area between an imaging field of the imaging device at the first position and the first photography frame, is obtained. In the combination operation, the anti-shake image signal is obtained by combining the first, second, third, and fourth image signals.

8 Claims, 17 Drawing Sheets

ANTI-SHAKE APPARATUS

BACKGROUND OF THE INVENTION

1. Field of the Invention

The present invention relates to an anti-shake apparatus of a photographing apparatus, and in particular to an image-combination apparatus for obtaining a corrected image signal for hand-shake.

2. Description of the Related Art

An anti-shake apparatus for a photographing apparatus is proposed. The anti-shake apparatus corrects for the hand-shake effect by moving an imaging surface on a plane that is perpendicular to the optical axis, corresponding to the amount of hand-shake which occurs during imaging.

Japanese examined patent publication (KOKOKU) No. H01-053957 discloses an electrical anti-shake apparatus which obtains an anti-shake (hand-shake corrected) image on the basis of an image signal which is imaged on a part of an imaging field of an imaging device. The part of the imaging field can be moved over all of the imaging field, corresponding to the hand-shake quantity. The part of the imaging field is equal to the imaging surface which is movable on the plane that is perpendicular to the optical axis.

However, in this electrical anti-shake apparatus, the image quality of the anti-shake image falls, and an angle of view is narrowed, in comparison with when the imaging operation is performed by using all of the imaging field of the imaging device.

SUMMARY OF THE INVENTION

Therefore, an object of the present invention is to provide an anti-shake apparatus which uses an imaging field of an imaging device effectively.

According to the present invention, an anti-shake apparatus of a photographing apparatus comprises a hand-shake quantity detecting unit, a movable unit, a fixed unit, and a control apparatus.

The hand-shake quantity detecting unit detects first, second, third, and fourth information regarding hand-shake of the photographing apparatus.

The movable unit has an imaging device which can be moved in first and second directions. The first direction is perpendicular to an optical axis of a photographing optical system of the photographing apparatus. The second direction is perpendicular to the first direction and the optical axis.

The fixed unit slidably supports the movable unit in the first and second directions.

The control apparatus moves the movable unit to first, second, third, and fourth positions in the movable unit's movement range, and performs a first imaging operation for obtaining a first image signal, a second imaging operation for obtaining a second image signal, a third imaging operation for obtaining a third image signal, and a fourth imaging operation for obtaining a fourth image signal, and a combination operation for obtaining an anti-shake image signal in which lag from the hand-shake is corrected.

In the first imaging operation, the first information is detected and input to the control apparatus. A first hand-shake quantity is calculated from the first information. Further, a first imaging position of a first photography frame in which lag corresponding to the first hand-shake quantity is corrected, is calculated on the basis of the first hand-shake quantity. Then the first image signal which is imaged at an overlapping area between an imaging field of the imaging device at the first position and the first photography frame, is obtained.

In the second imaging operation, the second information is detected and input to the control apparatus. A second hand-shake quantity is calculated from the second information. Further, a second imaging position of a second photography frame in which lag corresponding to the second hand-shake quantity is corrected, is calculated on the basis of the second hand-shake quantity. Then the second image signal which is imaged at an overlapping area between the imaging field at the second position and the second photography frame, is obtained.

In the third imaging operation, the third information is detected and input to the control apparatus. A third hand-shake quantity is calculated from the third information. Further, a third imaging position of a third photography frame in which lag corresponding to the third hand-shake quantity is corrected, is calculated on the basis of the third hand-shake quantity. Then the third image signal which is imaged at an overlapping area between the imaging field at the third position and the third photography frame, is obtained.

In the fourth imaging operation, the fourth information is detected and input to the control apparatus. A fourth hand-shake quantity is calculated from the fourth information. Further, a fourth imaging position of a fourth photography frame in which lag corresponding to the fourth hand-shake quantity is corrected, is calculated on the basis of the fourth hand-shake quantity. Then the fourth image signal which is imaged at an overlapping area between the imaging field at the fourth position and the fourth photography frame, is obtained.

In the combination operation, the anti-shake image signal is obtained by combining the first, second, third, and fourth image signals.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
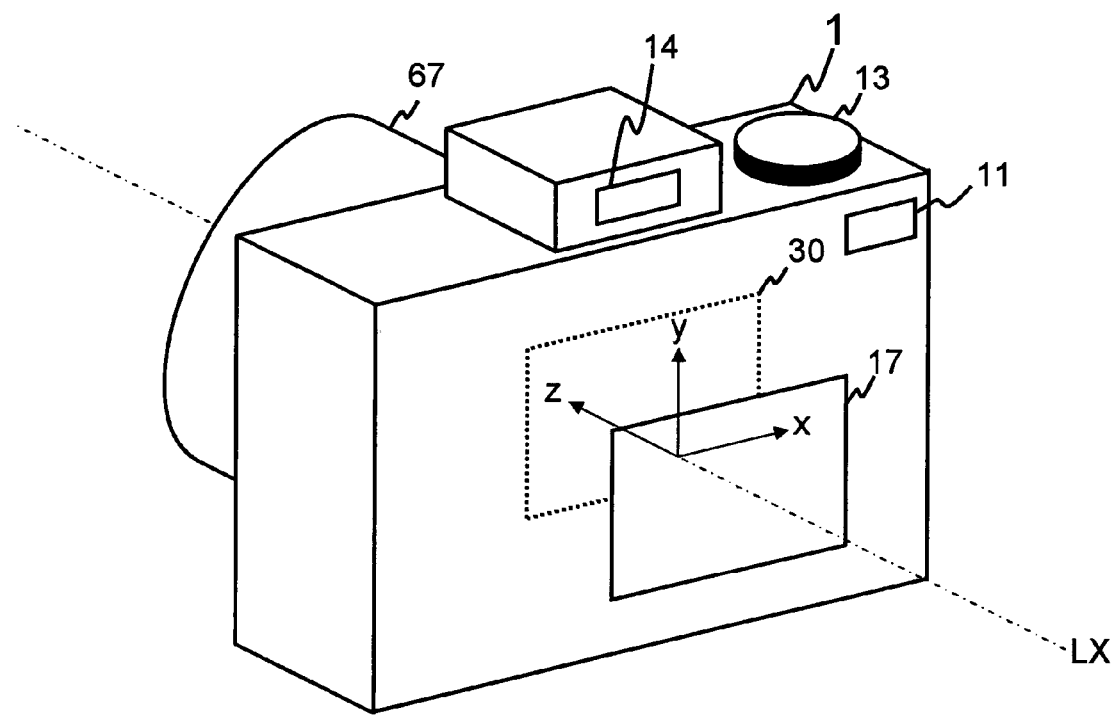
FIG. 1 is a perspective view of a photographing apparatus of the embodiment viewed from the back side of the photographing apparatus.

The present invention is described below with reference to the embodiments shown in the drawings. In the embodiment, the photographing device 1 is a digital camera. The photographing device 1 has an optical axis LX.

Figure 2:
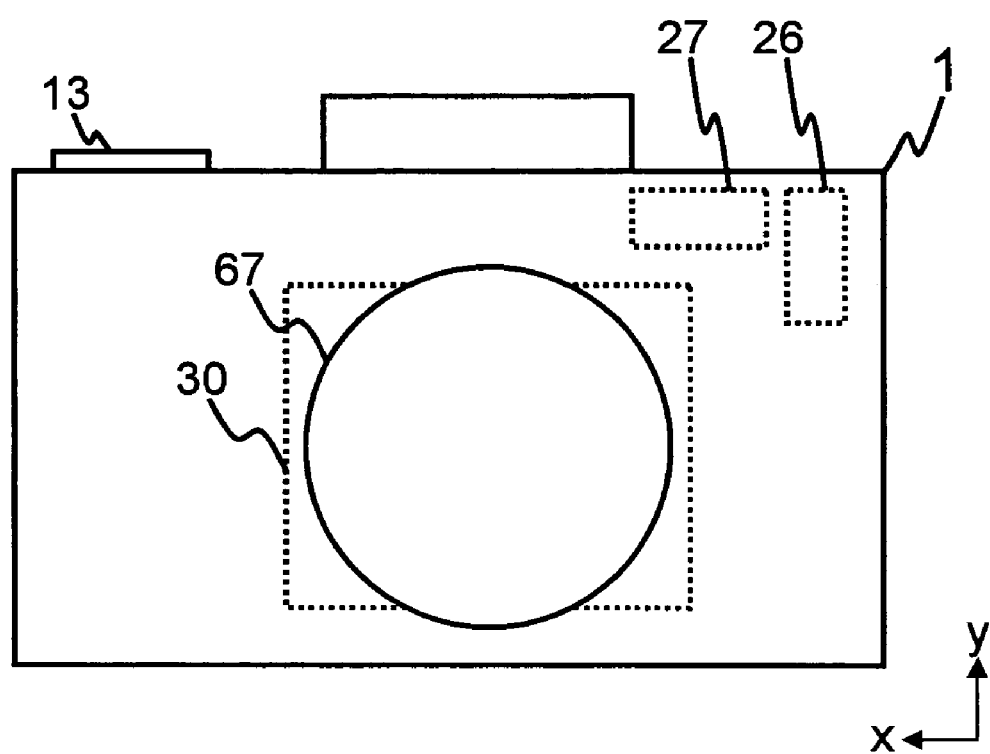
FIG. 2 is a front view of the photographing apparatus.
Figure 3:
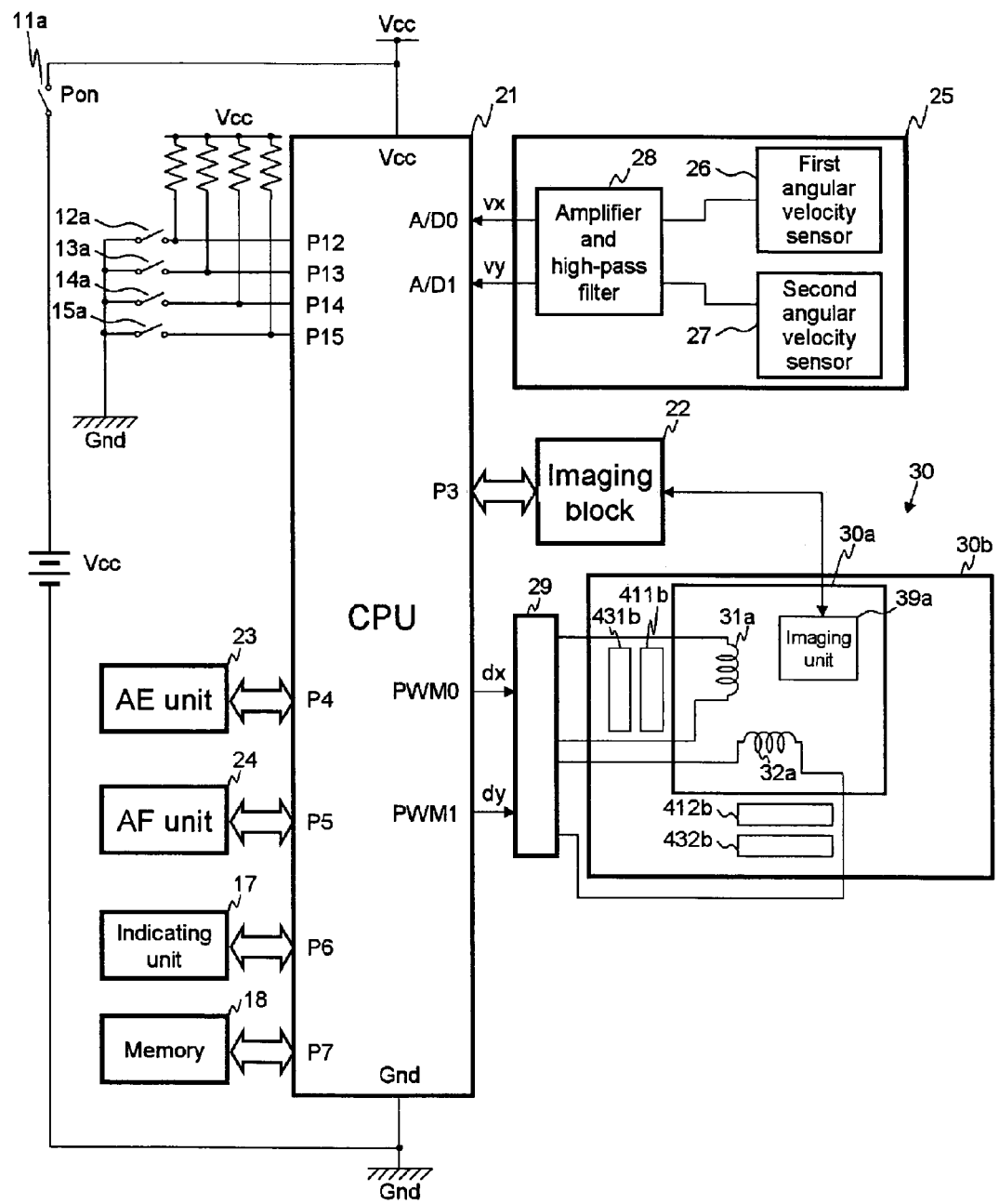
FIG. 3 is a circuit construction diagram of the photographing apparatus in the embodiment.
Figure 4:
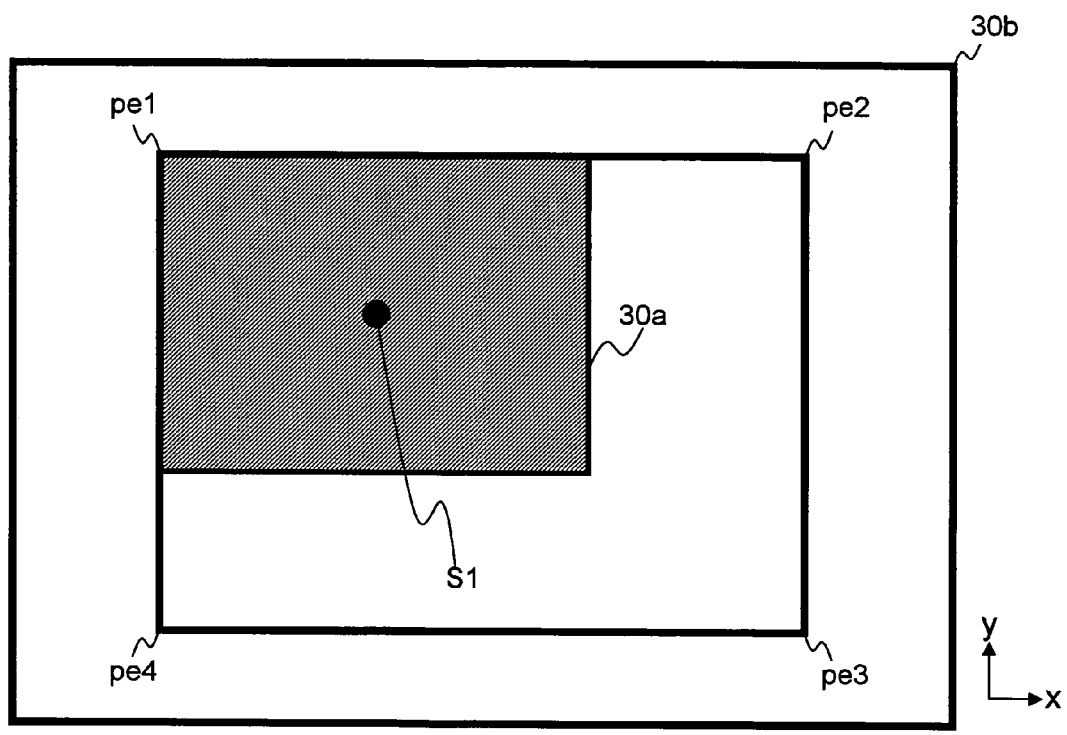
FIG. 4 is a construction diagram which simply shows the position relation between the movable unit and the fixed unit, when the movable unit is in the first position.
Figure 5:
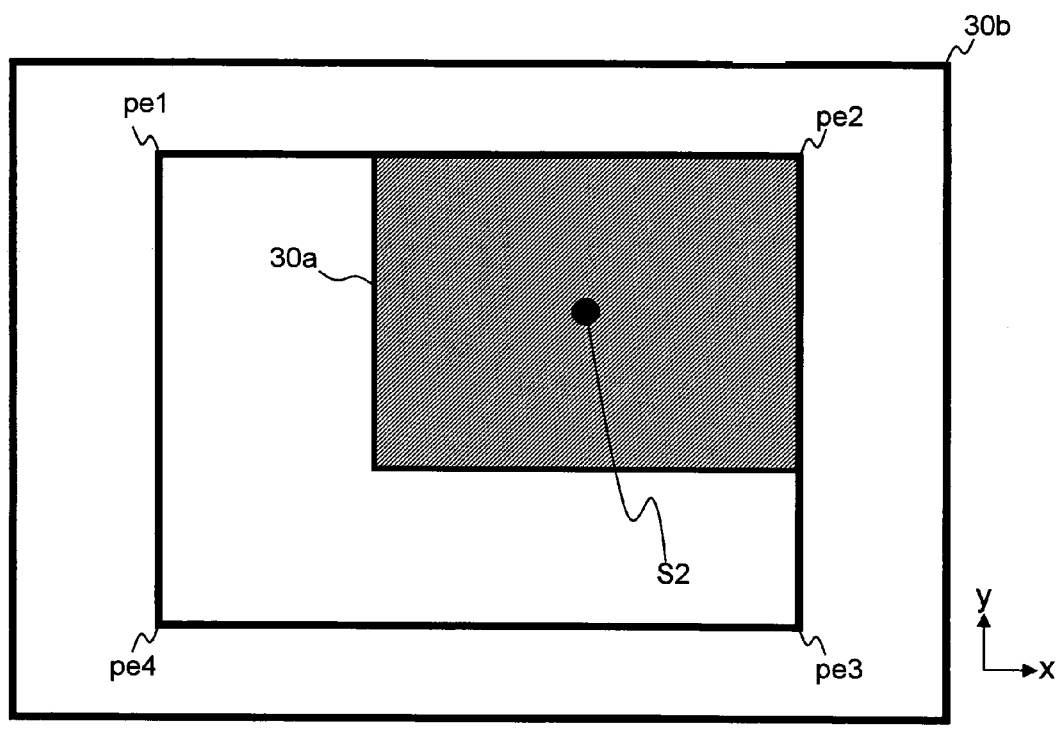
FIG. 5 is a construction diagram which simply shows the position relation between the movable unit and the fixed unit, when the movable unit is in the second position.
Figure 6:
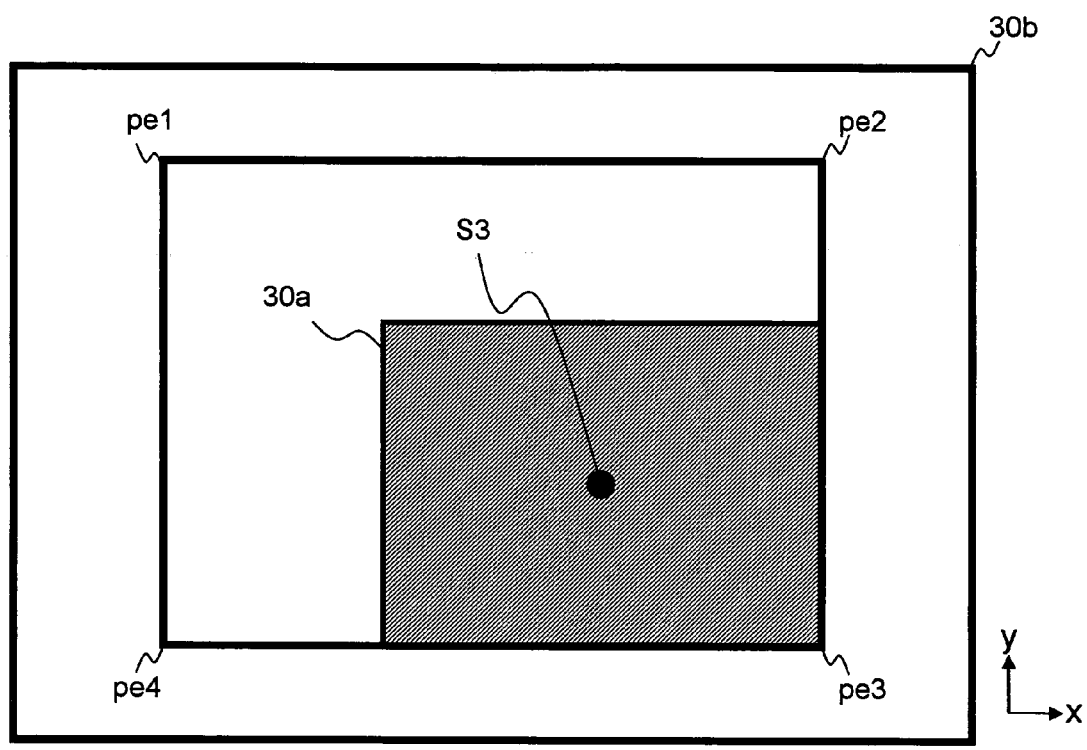
FIG. 6 is a construction diagram which simply shows the position relation between the movable unit and the fixed unit, when the movable unit is in the third position.
Figure 7:
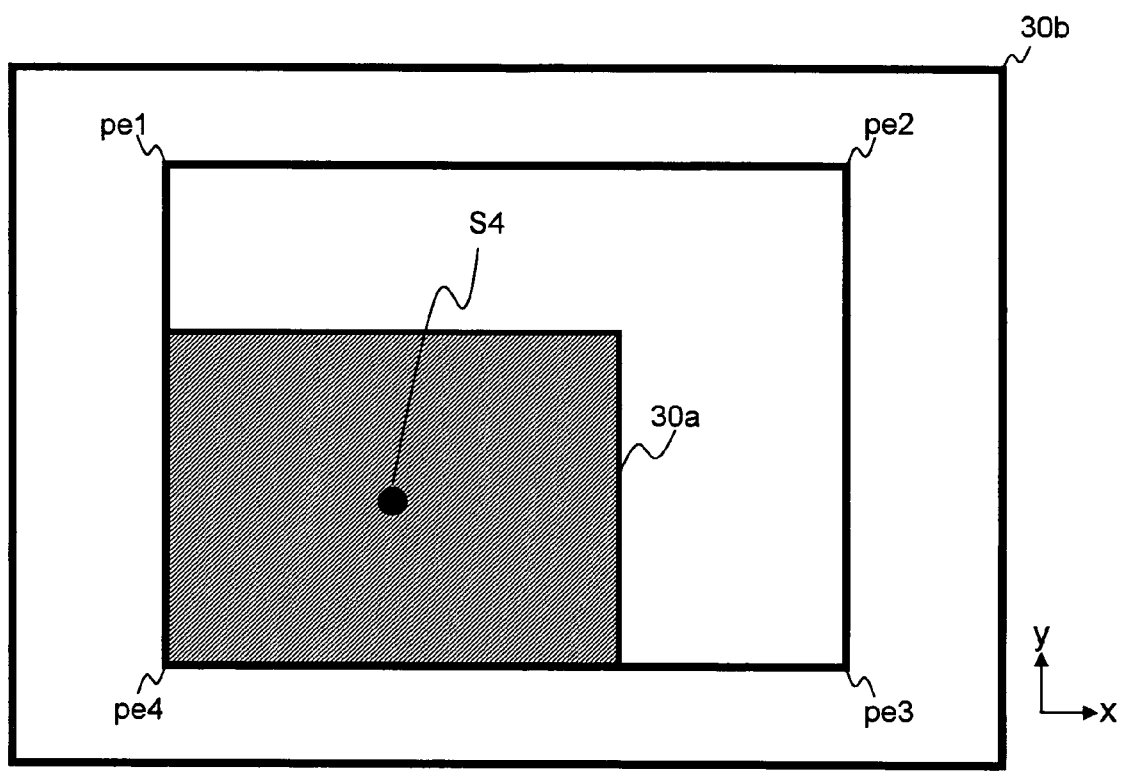
FIG. 7 is a construction diagram which simply shows the position relation between the movable unit and the fixed unit, when the movable unit is in the fourth position.

FIGS. 1 to 3 show the construction of the photographing apparatus 1 in the embodiment. FIGS. 4 to 7 are construction diagrams which show the location relation between the movable unit 30a and the fixed unit 30b. FIGS. 8 to 11 are construction diagrams which show the location relation between the imaging field IF of the imaging device 39a1 and the imaging field's movement range R1.

In order to explain the direction in this embodiment, a first direction x, a second direction y, and a third direction z are defined (see FIG. 1). The first direction x is a horizontal direction which is perpendicular to the optical axis LX. The second direction y is a vertical direction which is perpendicular to the optical axis LX and the first direction x. The third direction z is a horizontal direction which is parallel to the optical axis LX and perpendicular to both the first direction x and the second direction y.

Figure 13:
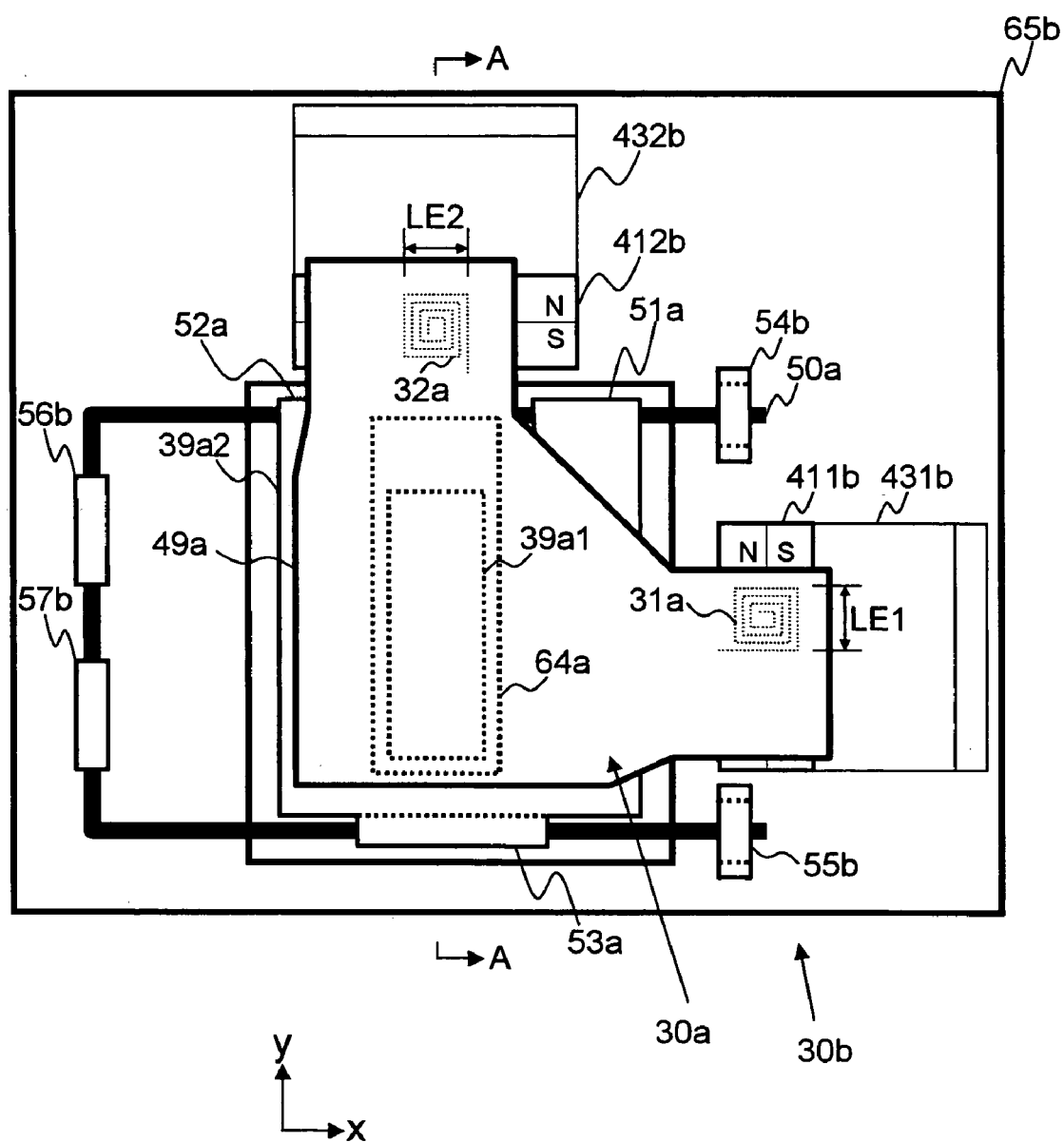
FIG. 13 is a figure showing the construction of the anti-shake unit.
Figure 14:
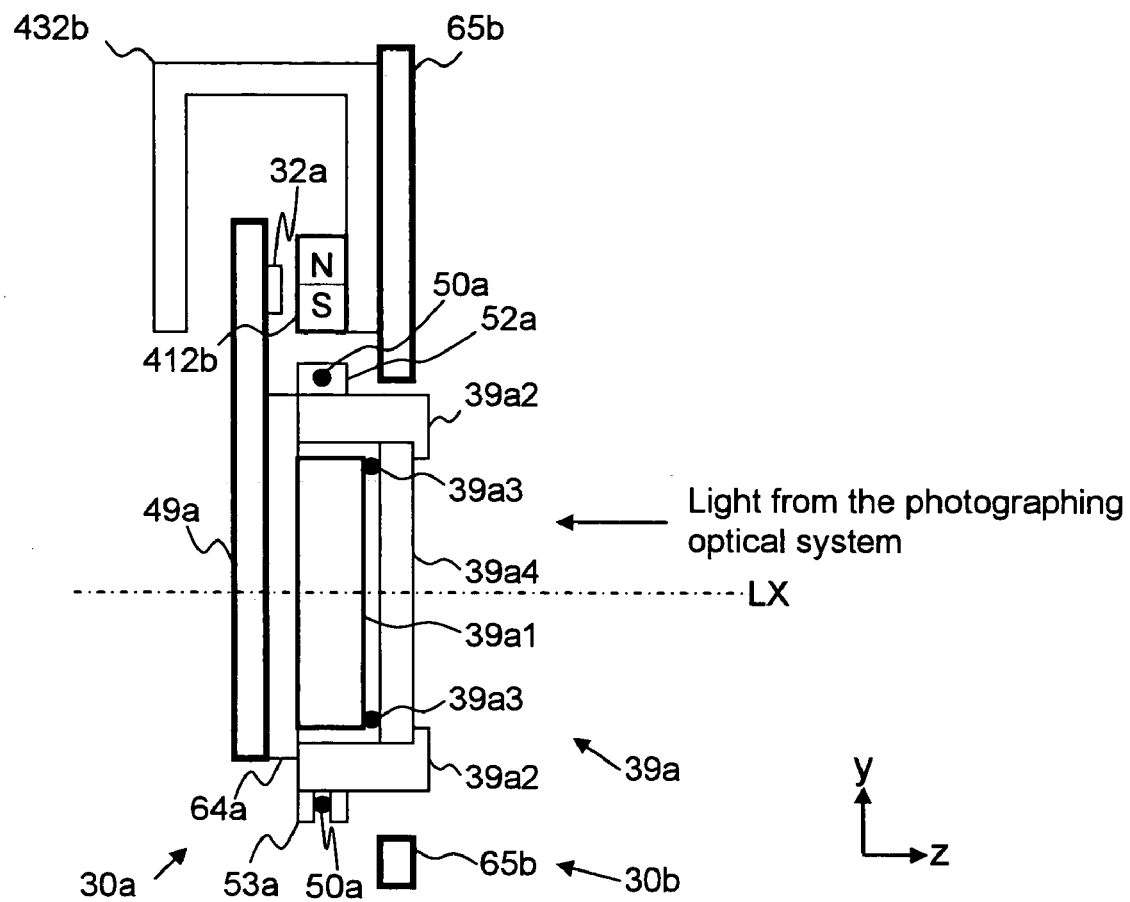
FIG. 14 is a view along line A-A of FIG. 13.

FIG. 14 shows a construction diagram of the section along line A-A of FIG. 13.

The imaging part of the photographing apparatus 1 comprises a Pon button 11, a Pon switch 11a, a photometric switch 12a, a release button 13, a release switch 13a, an indicating unit 17 such as an LCD monitor etc., a memory 18, a CPU 21, an imaging block 22, an AE (automatic exposure) unit 23, an AF (automatic focusing) unit 24, an imaging unit 39a in the anti-shake unit 30, and a photographing optical system 67 (see FIGS. 1, 2, and 3).

Whether the Pon switch 11a is in the on state or the off state, is determined by a state of the Pon button 11, so that the on/off states of the photographing apparatus 1 are changed corresponding to the on/off states of the Pon switch 11a.

The photographic subject image is captured in the imaging field IF of the imaging device 39a1 as an optical image through the photographing optical system 67. The imaging device 39a1 converts the optical image to electric signals by photoelectric conversion. After accumulation over a predetermined time length by the imaging device 39a1, the electric signals, which are converted from the optical image and which are based on the read out charges, are converted to image signals that can be indicated on the indicating unit 17 and stored in the memory 18, through the imaging block 22 and a DSP (Digital Signal Processor) of the CPU 21 etc.

The indicating unit 17 indicates the image signal as the photographic subject image. The photographic subject image can be optically observed by the optical finder (not depicted). The indicating unit 17 is connected with the port P6 of the CPU 21.

The memory 18 stores the image signal. The memory 18 is connected with the port P7 of the CPU 21.

The CPU 21 is a control apparatus, which controls each part of the photographing apparatus 1 regarding the imaging operation, and controls each part of the photographing apparatus 1 regarding the anti-shake operation including the control of the moving and position-detecting operation. The anti-shake operation controls the movement of the movable unit 30a and controls detecting the position of the movable unit 30a.

When the release button 13 is half pushed by the operator, the photometric switch 12a changes to the on state, so that the photometric operation, the AF sensing operation, and the focusing operation are performed.

When the release button 13 is fully pushed by the operator, the release switch 13a changes to the on state, so that the imaging operation is performed, and the image, which is taken, is stored.

The imaging block 22 drives the imaging unit 39a. The AE unit 23 performs the photometric operation for the photographic subject, calculates the photometric values, and calculates the aperture value and the time length of the exposure time, which is needed for imaging, corresponding to the photometric values. The AF unit 24 performs the AF sensing operation, and performs the focusing operation, which is needed for the imaging, corresponding to the result of the AF sensing operation. In the focusing operation, the position of the photographing optical system 67 is moved in the optical axis LX direction.

The anti-shaking part of the photographing apparatus 1 comprises an anti-shake button 14, an anti-shake switch 14a, an indicating unit 17, a memory 18, a CPU 21, an imaging block 22, an angular velocity detecting unit 25, a driver circuit 29, an anti-shake unit 30, and the photographing optical system 67.

When the anti-shake button 14 is fully pushed by the operator, the anti-shake switch 14a changes to the on state, so that the anti-shake operation is performed (the anti-shake mode) where the angular velocity detecting unit 25 and the anti-shake unit 30 are driven, at every second predetermined time interval, independently of the other operations which include the photometric operation etc. When the anti-shake switch 14a is in the on state, the photographing apparatus 1 is set in the anti-shake mode. When the anti-shake switch 14a is not in the on state, the photographing apparatus 1 is set in the non anti-shake mode. In this embodiment, the second predetermined time interval is 1 ms.

The various output commands corresponding to the input signals of these switches are controlled by the CPU 21.

The information regarding whether the photometric switch 12a is in the on state or in the off state, is input to port P12 of the CPU 21 as a 1-bit digital signal. The information regarding whether the release switch 13a is in the on state or in the off state, is input to port P13 of the CPU 21 as a 1-bit digital signal. The information regarding whether the anti-shake switch 14a is in the on state or in the off state, is input to port P14 of the CPU 21 as a 1-bit digital signal.

The imaging block 22 is connected to port P3 of the CPU 21 for inputting and outputting signals. The AE unit 23 is connected to port P4 of the CPU 21 for inputting and outputting signals. The AF unit 24 is connected to port P5 of the CPU 21 for inputting and outputting signals.

Next, the details of the input and output relationship with the CPU 21 for the angular velocity unit 25, the driver circuit 29, and the anti-shake unit 30, are explained.

The angular velocity unit 25 has a first angular velocity sensor 26, a second angular velocity sensor 27, and a combined amplifier and high-pass filter circuit 28. The first angular velocity sensor 26 detects the velocity-component in the first direction x of the angular velocity of the photographing apparatus 1, at every second predetermined time interval (1 ms). The second angular velocity sensor 27 detects the velocity-component in the second direction y of the angular velocity of the photographing apparatus 1, at every second predetermined time interval (1 ms).

The combined amplifier and high-pass filter circuit 28 amplifies the signal regarding the first direction x of the angular velocity (the velocity-component in the first direction x of the angular velocity), reduces a null voltage and a panning of the first angular velocity sensor 26, and outputs the analogue signal to the A/D converter A/D 0 of the CPU 21 as a first angular velocity vx.

The combined amplifier and high-pass filter circuit 28 amplifies the signal regarding the second direction y of the angular velocity (the velocity-component in the second direction y of the angular velocity), reduces a null voltage and a panning of the second angular velocity sensor 27, and outputs the analogue signal to the A/D converter A/D 1 of the CPU 21 as a second angular velocity vy.

The CPU 21 converts the first angular velocity vx which is input to the A/D converter A/D 0 and the second angular velocity vy which is input to the A/D converter A/D 1 to digital signals (A/D converting operation), and calculates the hand-shake quantity, which occurs in the predetermined time (1 ms), on the basis of the converted digital signals and the converting coefficient, where focal distance is considered. Accordingly, the CPU 21 and the angular velocity detecting unit 25 have a function which calculates the hand-shake quantity.

The CPU 21 calculates a position S of a photography frame F, which should be moved to, corresponding to the hand-shake quantity which is calculated, for the first direction x and the second direction y, when the photographing apparatus 1 is in the anti-shake mode.

The location in the first direction x of the position S of the photography frame F is defined as sx, and the location in the second direction y of the position S of the photography frame F is defined as sy. The photography frame is a field on a plane including an imaging field IF of the imaging device 39a1, which does not have lag of the photographic subject image, or to which the imaging field IF of the imaging device 39a1 should be moved for correcting the hand-shake effect. The size of the photography frame F is the same as the size of the imaging field IF. The position S of the photography frame F is set in a movement range R1 of the imaging field IF.

The CPU 21 sets the position S of a photography frame F (the position SF), to the center of the movement range R1, when the photographing apparatus 1 is in the non anti-shake mode.

In the embodiment, the size of the photography frame F is the same as the size of the imaging field IF. However, the size of the photography frame F may be larger than the size of the imaging field IF, under the condition that the size of the photography frame F is equal to or smaller than the movement range R1 of the imaging field IF.

When the photographing apparatus 1 is in the anti-shake mode, the anti-shake unit 30 obtains an anti-shake (hand-shake corrected) image signal Pss which is a part of a first image signal Ps1, a part of a second image signal Ps2, a part of a third image signal Ps3, and a part of a fourth image signal Ps4 combined.

The first image signal Ps1 is obtained by the imaging operation under the condition where the movable unit 30a is moved and contacts a first corner edge point pe1 (a first imaging operation).

The second image signal Ps2 is obtained by the imaging operation under the condition where the movable unit 30a is moved and contacts a second corner edge point pe2 (a second imaging operation).

The third image signal Ps3 is obtained by the imaging operation under the condition where the movable unit 30a is moved and contacts a third corner edge point pe3 (a third imaging operation).

The fourth image signal Ps4 is obtained by the imaging operation under the condition where the movable unit 30a is moved and contacts a fourth corner edge point pe4 (a fourth imaging operation).

An anti-shake (hand-shake corrected) image PicS is indicated on an indicating field of the indicating unit 17, on the basis of the anti-shake image signal Pss.

The anti-shake unit 30 is an apparatus which corrects the hand-shake effect, by canceling lag of the photographic subject image on the plane including an imaging field IF of the imaging device 39a1, and by stabilizing the photographing subject image that reaches the plane including an imaging field IF of the imaging device 39a1.

The anti-shake unit 30 has a movable unit 30a, which includes the imaging unit 39a, and a fixed unit 30b.

The movable unit 30a is moved to a point where the movable unit 30a contacts the first corner edge point pe1, or the second corner edge point pe2, or the third corner edge point pe3, or the fourth corner edge point pe4, by the electro-magnetic force generated by the coil and magnet, in the anti-shake mode.

The movable unit 30a is moved to a center of its movement range in the non anti-shake mode, by the electro-magnetic force based on the coil and magnet.

The size and the direction of the electromagnetic force are determined by the size and the direction of the current which flows in the coil, and the size and the direction of the magnetic-field of the magnet.

The driving force D, which drives the driver circuit 29 in order to move the movable unit 30a, has a first PWM duty dx as the driving-force component in the first direction x, and a second PWM duty dy as the driving-force component in the second direction y.

The movable unit 30a is movable in both the first direction x and the second direction y, however the photographing optical system 67 is not movable (fixed). Accordingly, the imaging field IF is moved corresponding to the movement of the movable unit 30a, however the direction of the optical axis LX is not changed.

The first corner edge point pe1 is one of the two corner edge points of the movable unit's movement range in the first direction x, and is one of the two corner edge points of the movable unit's movement range in the second direction y. When the movable unit 30a contacts the first corner edge point pe1, the position of the center of the imaging device 39a1 of the movable unit 30a is defined as a first position S1 (see FIG. 4).

The second corner edge point pe2 is another of the two corner edge points of the movable unit's movement range in the first direction x, and is one of the two corner edge points of the movable unit's movement range in the second direction y. When the movable unit 30a contacts the second corner edge point pe2, the position of the center of the imaging device 39a1 of the movable unit 30a is defined as a second position S2 (see FIG. 5).

The third corner edge point pe3 is another of the two corner edge points of the movable unit's movement range in the first direction x, and is another of the two corner edge points of the movable unit's movement-range in the second direction y. When the movable unit 30a contacts the third corner edge point pe3, the position of the center of the imaging device 39a1 of the movable unit 30a is defined as a third position S3 (see FIG. 6).

The fourth corner edge point pe4 is one of the two corner edge points of the movable unit's movement range in the first direction x, and is another of the two corner edge points of the movable unit's movement range in the second direction y. When the movable unit 30a contacts the fourth corner edge point pe4, the position of the center of the imaging device 39a1 of the movable unit 30a is defined as a fourth position S4 (see FIG. 7).

The movable unit's movement range (the movement range of the center of the imaging device 39a1 of the movable unit 30a) is equal to a range which is tied up and surrounded by the first, second, third, and fourth corner edge points pe1, pe2, pe3, and pe4.

When the anti-shake operation is performed, and before the movable unit 30a is moved to the first position S1, the hand-shake quantity is calculated, so that the position S of the photography frame F is calculated on the basis of the hand-shake quantity.

The position S of the photography frame F which is calculated before the movable unit 30a is moved to the first position S1, is defined as a first imaging position SS1 of a first photography frame F1.

The position S of the photography frame F which is calculated before the movable unit 30a is moved to the second position S2 after the movable unit 30a is moved to the first position S1, is defined as a second imaging position SS2 of a second photography frame F2.

The position S of the photography frame F which is calculated before the movable unit 30a is moved to the third position S3 after the movable unit 30a is moved to the second position S2, is defined as a third imaging position SS3 of a third photography frame F3.

The position S of the photography frame F which is calculated before the movable unit 30a is moved to the fourth position S4 after the movable unit 30a is moved to the third position S3, is defined as a fourth imaging position SS4 of a fourth photography frame F4.

When the anti-shake operation is not performed, the position S of the photography frame F which is defined as a centered position SF of a centered photography frame FF is set to the center of the movement range of the imaging field IF.

Figure 8:
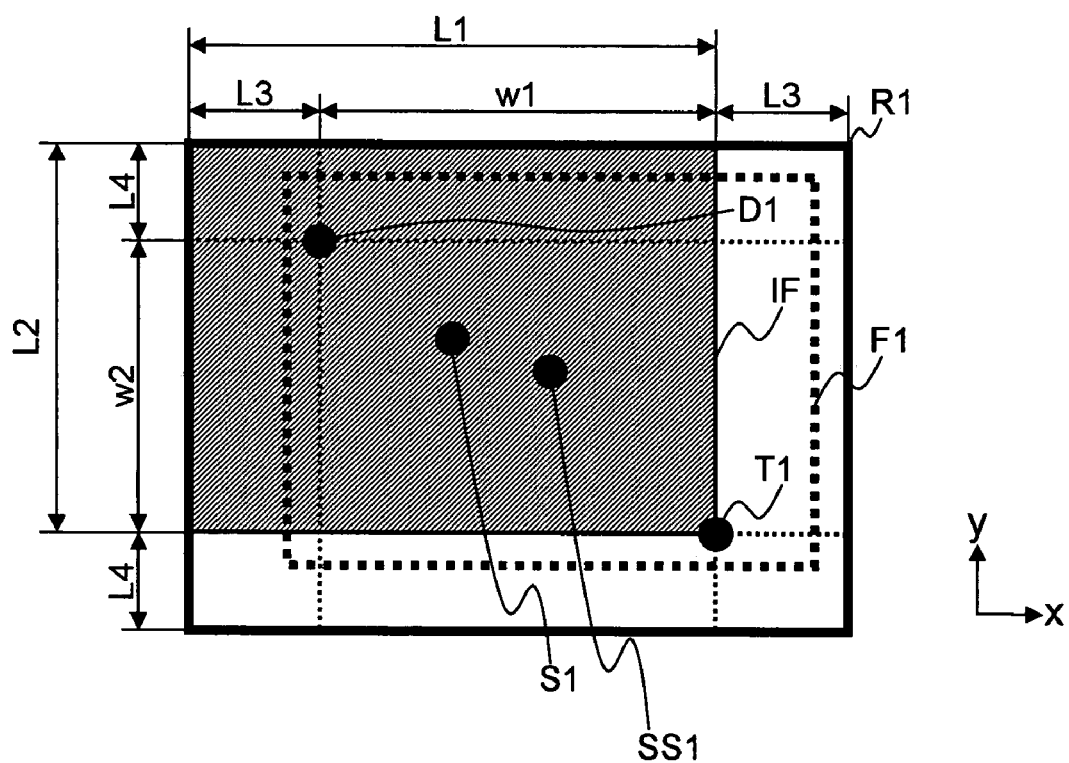
FIG. 8 shows a position relation of the imaging field, when the movable unit is in the first position.

When the movable unit 30a is moved to the first position S1, an image signal which is obtained for a first predetermined area of the imaging device 39a1, is defined as a first image signal Ps1 (the first imaging operation). The first predetermined area of the imaging device 39a1 is an overlapping area between the imaging field IF of the imaging device 39a1 of the movable unit 30a at the first position S1, and the first photography frame F1 for the anti-shake operation (see FIG. 8) or the centered photography frame FF when the anti-shake operation is not performed (not depicted). In FIG. 8, the imaging field IF of the imaging device 39a1 of the movable unit 30a at the first position S1, is shown by a shaded area, and the first photography frame F1 is shown by a dotted line.

Figure 9:
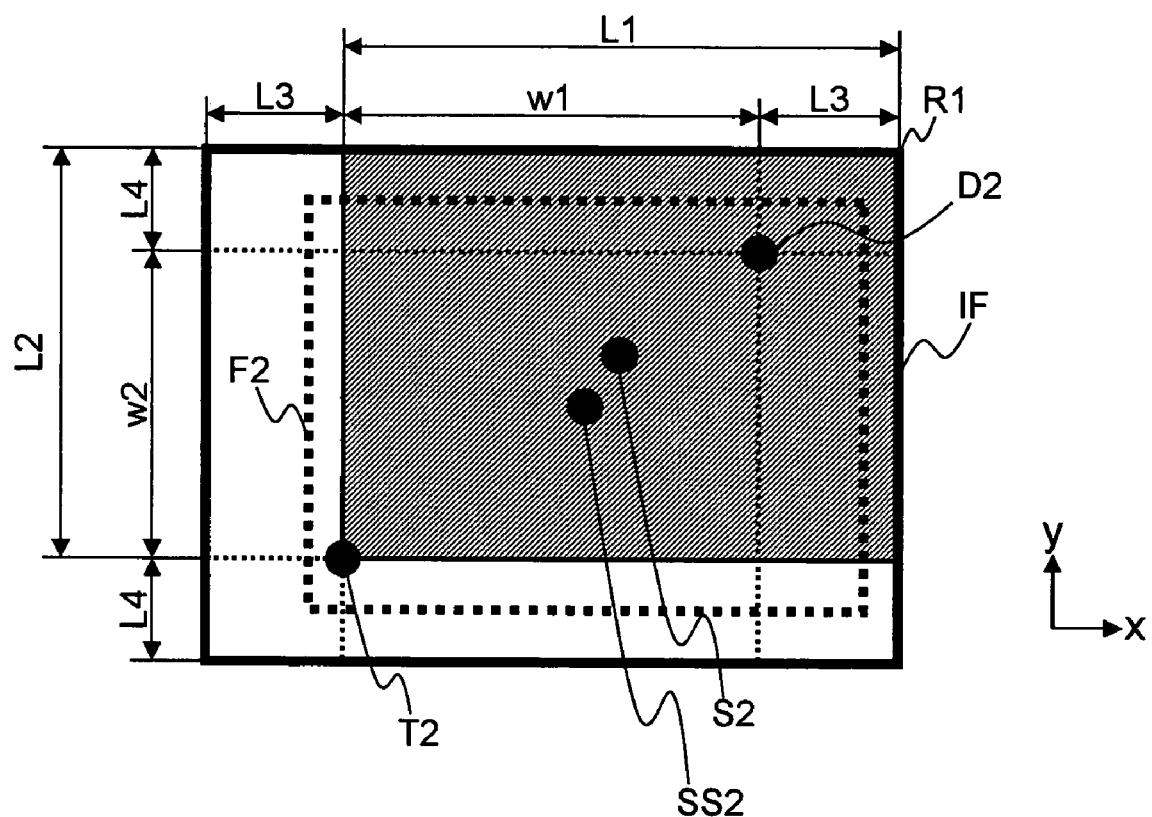
FIG. 9 shows a position relation of the imaging field, when the movable unit is in the second position.

When the movable unit 30a is moved to the second position S2, an image signal which is obtained for a second predetermined area of the imaging device 39a1, is defined as a second image signal Ps2 (the second imaging operation). The second predetermined area of the imaging device 39a1 is an overlapping area between the imaging field IF of the imaging device 39a1 of the movable unit 30a at the second position S2, and the second photography frame F2 for the anti-shake operation (see FIG. 9) or the centered photography frame FF when the anti-shake operation is not performed. In FIG. 9, the imaging field IF of the imaging device 39a1 of the movable unit 30a at the second position S2, is shown by a shaded area, and the second photography frame F2 is shown by a dotted line.

Figure 10:
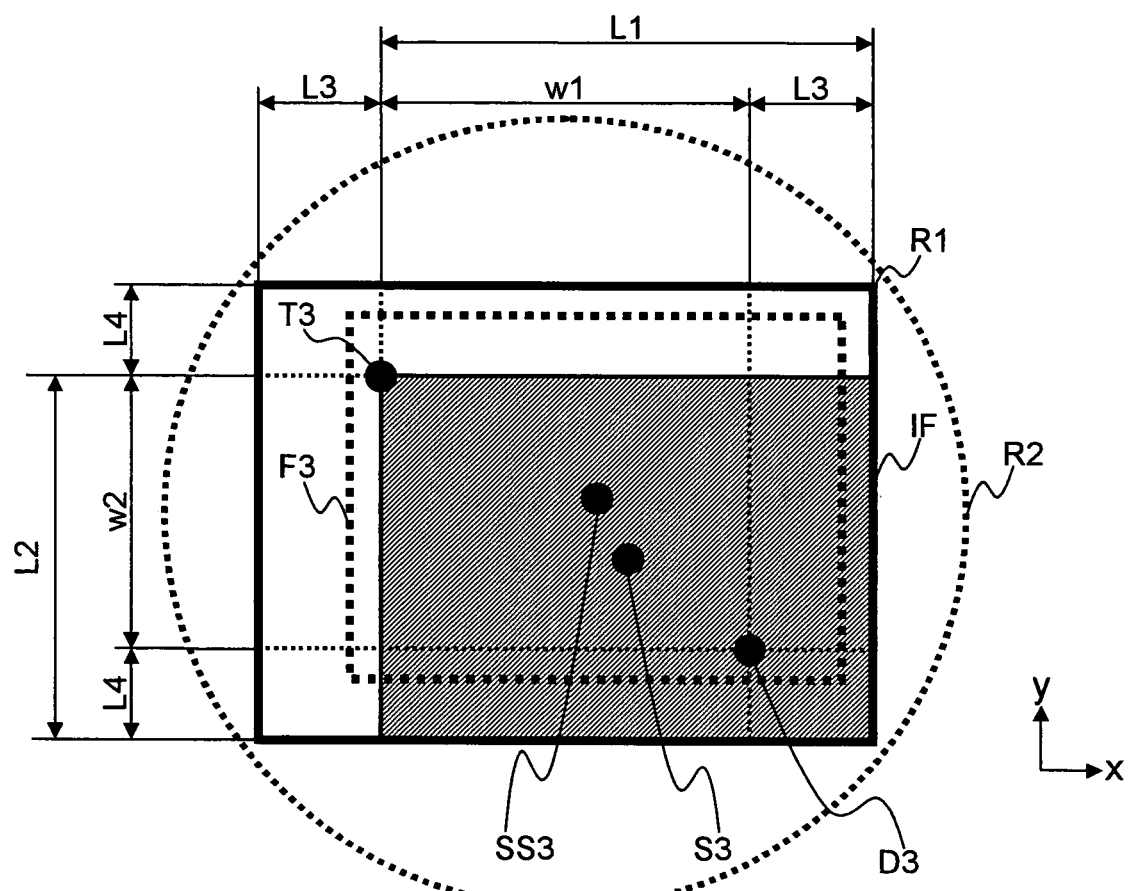
FIG. 10 shows a position relation of the imaging field, when the movable unit is in the third position.

When the movable unit 30a is moved to the third position S3, an image signal which is obtained for a third predetermined area of the imaging device 39a1, is defined as a third image signal Ps3 (the third imaging operation). The third predetermined area of the imaging device 39a1 is an overlapping area between the imaging field IF of the imaging device 39a1 of the movable unit 30a at the third position S3, and the third photography frame F3 for the anti-shake operation (see FIG. 10) or the centered photography frame FF when the anti-shake operation is not performed. In FIG. 10, the imaging field IF of the imaging device 39a1 of the movable unit 30a at the third position S3, is shown by a shaded area, and the third photography frame F3 is shown by a dotted rectangle line.

Figure 11:
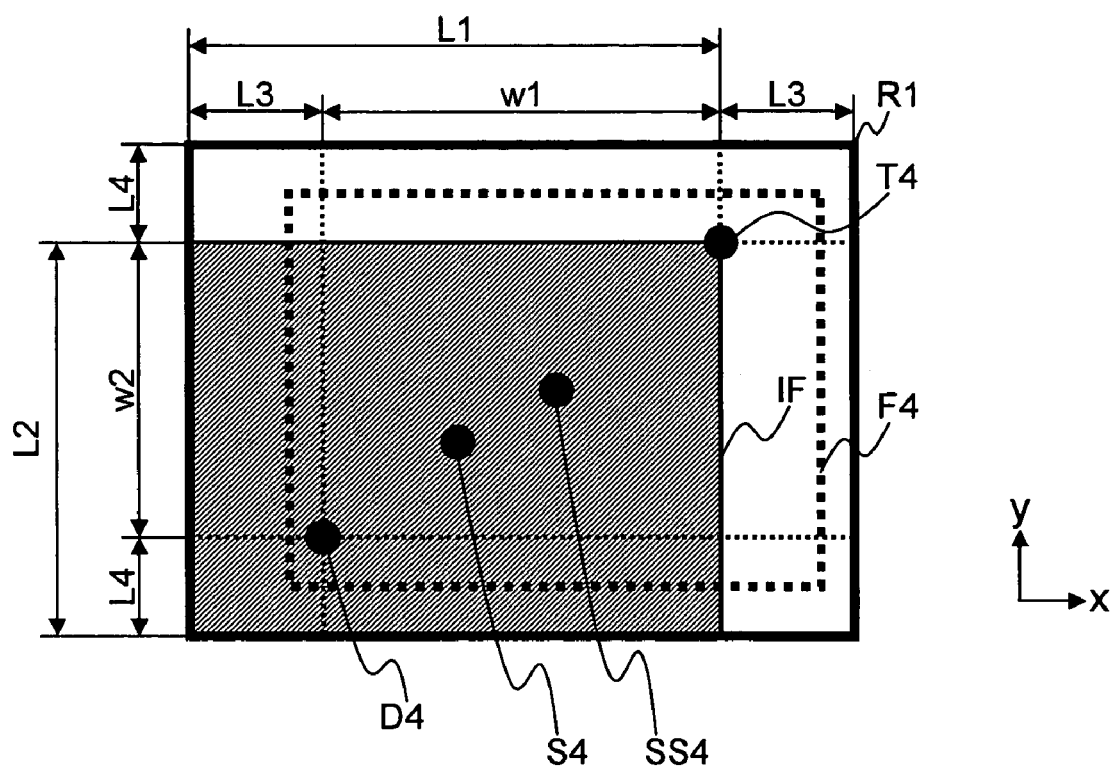
FIG. 11 shows a position relation of the imaging field, when the movable unit is in the fourth position.

When the movable unit 30a is moved to the fourth position S4, an image signal which is obtained for a fourth predetermined area of the imaging device 39a1, is defined as a fourth image signal Ps4 (the fourth imaging operation). The fourth predetermined area of the imaging device 39a1 is an overlapping area between the imaging field IF of the imaging device 39a1 of the movable unit 30a at the fourth position S4, and one of the fourth photography frame F4 for the anti-shake operation (see FIG. 11) or the centered photography frame FF when the anti-shake operation is not performed. In FIG. 11, the imaging field IF of the imaging device 39a1 of the movable unit 30a at the fourth position S4, is shown by a shaded area, and the fourth photography frame F4 is shown by a dotted line.

It is desirable that the CPU 21 controls the order of movement of the movable unit 30a (the order of the first, second, third, and fourth imaging operations) to be right-handed or left-handed viewed from the third direction z. In the embodiment, the order of movement of the movable unit 30a is right-handed viewed from the third direction z, that is a first movement is to the first position SI, a second is to the second position S2, a third is to the third position S3, and a fourth is to the fourth position s4.

The driving of the movable unit 30a of the anti-shake unit 30, is performed by the driver circuit 29 which has the first PWM duty dx input from the PWM 0 of the CPU 21 and has the second PWM duty dy input from the PWM 1 of the CPU 21.

The values of the first and second PWM duties dx and dy for moving the movable unit 30a to the first, second, third, and fourth positions S1, S2, S3, and S4, are stored in the CPU 21. Accordingly, when the movable unit 30a is moved to the first, second, third, and fourth position S1, S2, S3, and S4, in the anti-shake mode, the PID (Proportional Integral Differential) control may not be performed.

The values of the first and second PWM duties dx and dy for moving the movable unit 30a to the first, second, third, and fourth positions S1, S2, S3, and S4, are set in advance, considering an effect of gravity etc. which is changed by the direction of holding the photographing apparatus 1.

The movable unit 30a has a first coil 31a, a second coil 32a, an imaging unit 39a, a movable circuit board 49a, a shaft for movement 50a, a first bearing unit for horizontal movement 51a, a second bearing unit for horizontal movement 52a, a third bearing unit for horizontal movement 53a, and a plate 64a (see FIGS. 13 and 14).

The fixed unit 30b has a first magnet 411b, a second magnet 412b, a first yoke 431b, a second yoke 432b, a first bearing unit for vertical movement 54b, a second bearing unit for vertical movement 55b, a third bearing unit for vertical movement 56b, a fourth bearing unit for vertical movement 57b, and a base board 65b.

The shaft for movement 50a of the movable unit 30a has a channel shape when viewed from the third direction z. The first, second, third, and fourth bearing units for vertical movement 54b, 55b, 56b, and 57b are attached to the base board 65b of the fixed unit 30b. The shaft for movement 50a is slidably supported in the vertical direction (the second direction y), by the first, second, third, and fourth bearing units for vertical movement 54b, 55b, 56b, and 57b.

The first and second bearing units for vertical movement 54b and 55b have slots which extend in the second direction y.

Therefore, the movable unit 30a can move relative to the fixed unit 30b, in the vertical direction (the second direction y) linearly.

The shaft for movement 50a is slidably supported in the horizontal direction (the first direction x), by the first, second, and third bearing units for horizontal movement 51a, 52a, and 53a of the movable unit 30a. Therefore, the movable unit 30a, except for the shaft for movement 50a, can move relative to the fixed unit 30b and the shaft for movement 50a, in the horizontal direction (the first direction x) linearly.

The imaging device has an imaging field IF which has a first length L1 in the first direction x and has a second length L2 in the second direction y.

A second position S2's side area of the imaging field IF when the movable unit 30a is moved to the first position S1, and a first position S1's side area of the imaging field IF when the movable unit 30a is moved to the second position S2, have an overlapping area which has a first width w1 in the first direction x and has the second length L2 in the second direction y (see FIGS. 8 and 9).

A third position S3's side area of the imaging field IF when the movable unit 30a is moved to the second position S2, and a second position S2's side area of the imagine field IF when the movable unit 30a is moved to the third position S3, have an overlapping area which has the first length L1 in the first direction x and has a second width w2 in the second direction y (see FIGS. 9 and 10).

A movement range R1 of the imaging field IF both in the first direction x and the second direction y, is inside a range R2 of an image circle (see FIG. 10). The image circle is equal to an imaging range of the light through the photographing optical system 67, on the imaging surface of the imaging device 39a1.

Accordingly, it is desirable that the first and second widths w1 and w2 are set to be as short as possible under the above conditions, in order to perform the anti-shake operation at a wider range in comparison with when the first and second widths w1 and w2 are set to be long.

When the anti-shake operation for obtaining the anti-shake image signal Pss is performed, the first imaging operation is performed under the condition where the movable unit 30a is moved to the first position S1, so that the first image signal Ps1 is temporally stored in the CPU 21. The second imaging operation is performed under the condition where the movable unit 30a is moved to the second position S2, so that the second image signal Ps2 is temporally stored in the CPU 21. The third imaging operation is performed under the condition where the movable unit 30a is moved to the third position S3, so that the third image signal Ps3 is temporally stored in the CPU 21. The fourth imaging operation is performed under the condition where the movable unit 30a is moved to the fourth position S4, so that the fourth image signal Ps4 is temporally stored in the CPU 21.

Overlapping areas between a first image Pic1 based on the first image signal Ps1, a second image Pic2 based on the second image signal Ps2, a third image Pic3 based on the third image signal Ps3, and a fourth image Pic4 based on the fourth image signal Ps4, are overlapped, so that the first, second, third, and fourth image signals Ps1, Ps2, Ps3, and Ps4 are connected. And then, the anti-shake image signal Pss is obtained by the combination. An image signal corresponding to the overlapping area is one of the first, second, third, and fourth image signals Ps1, Ps2, Ps3, and Ps4. In other words, in the combination of the first, second, third, and fourth image signals Ps1, Ps2, Ps3, and Ps4, each signal is addressed regarding the overlapping area, and each signal is added regarding the non overlapping area.

A size and a position of the overlapping area between the first, second, third, and fourth images Pic1, Pic2, Pic3, and Pic4, are determined on the basis of the size of the imaging field IF (the lengths of the first and second lengths L1 and L2), and the lengths of the first and second widths w1 and w2. The values of the first and second lengths L1 and L2 and the first and second widths w1 and w2 are determined by the design conditions of the photographing apparatus 1.

The information regarding the size and the position of the overlapping area between the first, second, third, and fourth images Pic1, Pic2, Pic3, and Pic4, is stored in the memory of the CPU 21, as coordinate data. The coordinate data has a first coordinate data D1 and a first edge-point coordinate data T1 for when the movable unit 30a is moved to the first position S1, and has a second coordinate data D2 and a second edge-point coordinate data T2 for when the movable unit 30a is moved to the second position S2, and has a third coordinate data D3 and a third edge-point coordinate data T3 for when the movable unit 30a is moved to the third position S3, and has a fourth coordinate data D4 and a fourth edge-point coordinate data T4 for when the movable unit 30a is moved to the fourth position S4.

When the movable unit 30a is in the first position S1, the first coordinate data D1 and the first edge-point coordinate data T1 are used as the corresponding coordinate information for the imaging device 39a1 (see FIG. 8).

A rectangular area which has a peripheral line being parallel to the first direction x and passing through the first coordinate data D1, a peripheral line being parallel to the second direction y and passing through the first coordinate data D1, a peripheral line being parallel to the first direction x and passing through the first edge-point coordinate data T1, and a peripheral line being parallel to the second direction y and passing through the first edge-point coordinate data T1, shows a field of pixels of the imaging device 39a1 which is used for imaging and that overlap when the movable unit 30a is in the second position S2, or the third position S3, or the fourth position S4.

The first edge-point coordinate data T1 is one of four coordinate data which compose the imaging field IF of the imaging device 39a1.

When the movable unit 30a is in the second position S2, the second coordinate data D2 and the second edge-point coordinate data T2 are used as the corresponding coordinate information for the imaging device 39a1 (see FIG. 9).

A rectangular area which has a peripheral line being parallel to the first direction x and passing through the second coordinate data D2, a peripheral line being parallel to the second direction y and passing through the second coordinate data D2, a peripheral line being parallel to the first direction x and passing through the second edge-point coordinate data T2, and a peripheral line being parallel to the second direction y and passing through the second edge-point coordinate data T2, shows a field of pixels of the imaging device 39a1 which is used for imaging and that overlap when the movable unit 30a is in the first position S1, or the third position S3, or the fourth position S4.

The second edge-point coordinate data T2 is one of four coordinate data which compose the imaging field IF of the imaging device 39a1.

When the movable unit 30a is in the third position S3, the third coordinate data D3 and the third edge-point coordinate data T3 are used as the corresponding coordinate information for the imaging device 39a1 (see FIG. 10).

A rectangular area which has a peripheral line being parallel to the first direction x and passing through the third coordinate data D3, a peripheral line being parallel to the second direction y and passing through the third coordinate data D3, a peripheral line being parallel to the first direction x and passing through the third edge-point coordinate data T3, and a peripheral line being parallel to the second direction y and passing through the third edge-point coordinate data T3, shows a field of pixels of the imaging device 39a1 which is used for imaging and that overlap when the movable unit 30a is in the first position S1, or the second position S2, or the fourth position S4.

The third edge-point coordinate data T3 is one of four coordinate data which compose the imaging field IF of the imaging device 39a1.

When the movable unit 30a is in the fourth position S4, the fourth coordinate data D4 and the fourth edge-point coordinate data T4 are used as the corresponding coordinate information for the imaging device 39a1 (see FIG. 11).

A rectangular area which has a peripheral line being parallel to the first direction x and passing through the fourth coordinate data D4, a peripheral line being parallel to the second direction y and passing through the fourth coordinate data D4, a peripheral line being parallel to the first direction x and passing through the fourth edge-point coordinate data T4, and a peripheral line being parallel to the second direction y and passing through the fourth edge-point coordinate data T4, shows a field of pixels of the imaging device 39a1 which is used for imaging and that overlap when the movable unit 30a is in the first position S1, or the second position S2, or the third position S3.

The fourth edge-point coordinate data T4 is one of four coordinate data which compose the imaging field IF of the imaging device 39a1.

The CPU 21 recognizes the overlapping image field based on the first coordinate data D1, the second coordinate data D2, the third coordinate data D3, the fourth coordinate data D4, the first edge-point coordinate data T1, the second edge-point coordinate data T2, the third edge-point coordinate data T3, and the fourth edge-point coordinate data T4, and combines the first, second, third, and fourth image signals Ps1, Ps2, Ps3, and Ps4, for obtaining the anti-shake image signal Pss.

After the first, second, third, and fourth imaging operations, an anti-shake image PicS based on the anti-shake image signal Pss is indicated on the indicating field of the indicating unit 17. The anti-shake image signal Pss is stored in the memory 18.

Only one of the image signals regarding the overlapping area may be temporally stored in the CPU 21.

Accordingly, the image signal which is converted from the electric signal on the basis of the accumulated electric charge which is read out for the part of the imaging field IF which is needed for the combination, may be temporally stored in the CPU 21, as the first, second, third, and fourth image signals Ps1, Ps2, Ps3, and Ps4.

Therefore, a capacity of the memory of the CPU 21 which is needed for temporally storing, can be reduced, so that the response speed of the operation can be high.

In this case, the anti-shake image signal Pss is formed from the first, second, third, and fourth image signals Ps1, Ps2, Ps3, and Ps4, under the condition where the first, second, third, and fourth images Pic1, Pic2, Pic3, and Pic4 are bounded to each other.

Figure 12:
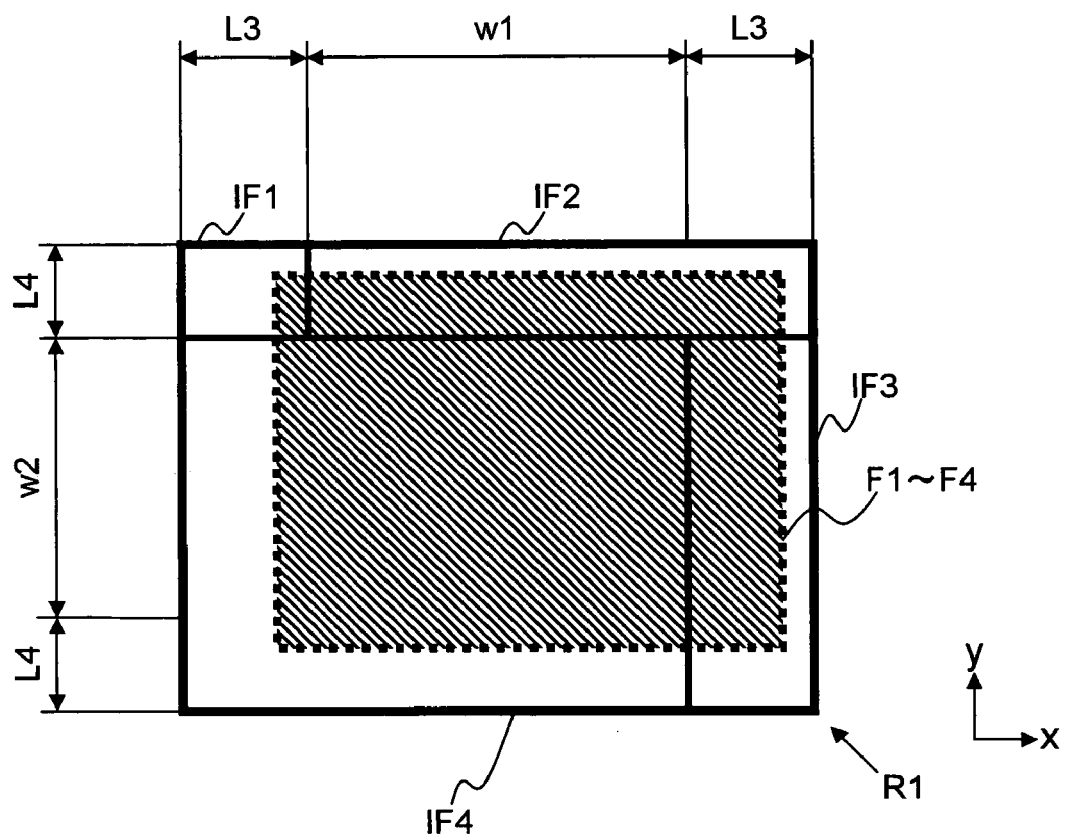
FIG. 12 is a construction diagram which simply shows a position relation between the first, second, third, and fourth imaging fields.

In the embodiment, when the movable unit 30a is in the first position S1, an area of the imaging field IF which is imaged without overlapping when the movable unit 30a is in the second position S2, or the third position S3, or the fourth position S4, is defined as a first imaging field IF1. The first image signal Ps1 which is based on the accumulated electric charge in an overlapping area between the first imaging field IF1 and one of the first photography frame F1 and the centered photography frame FF, is temporally stored in the CPU 21. In FIG. 12, the first photography frame F1 is shown by a shaded area. The first imaging field IF1 is rectangular and has a third length L3 in the first direction x and a fourth length L4 in the second direction y (see FIG. 12).

When the movable unit 30a is in the second position S2, an area of the imaging field IF which is imaged without overlapping when the movable unit 30a is in the third position S3, or the fourth position S4, is defined as a second imaging field IF2. The second image signal Ps2 which is based on the accumulated electric charge in an overlapping area between the second imaging field IF2 and one of the second photography frame F2 and the centered photography frame FF, is temporally stored in the CPU 21. In FIG. 12, the second photography frame F2 is shown by the shaded area. The second imaging field IF2 is rectangular and has the first length L1 in the first direction x and the fourth length L4 in the second direction y.

When the movable unit 30a is in the third position S3, an area of the imaging field IF which is imaged without overlapping when the movable unit 30a is in the fourth position S4, is defined as a third imaging field IF3. The third image signal Ps3 which is based on the accumulated electric charge in an overlapping area between the third imaging field IF3 and one of the third photography frame F3 and the centered photography frame FF, is temporally stored in the CPU 21. In FIG. 12, the third photography frame F3 is shown by the shaded area. The third imaging field IF3 is rectangular and has the third length L3 in the first direction x and the second length L2 in the second direction y.

When the movable unit 30a is in the fourth position S4, an area of the imaging field IF is defined as a fourth imaging field IF4. The fourth image signal Ps4 which is based on the accumulated electric charge in an overlapping area between the fourth imaging field IF4 and one of the fourth photography frame F4 and the centered photography frame FF, is temporally stored in the CPU 21. In FIG. 12, the fourth photography frame F4 is shown by the shaded area. The fourth imaging field IF4 is rectangular and has the first length L1 in the first direction x and the second length L2 in the second direction y.

When the center area of the imaging field IF of the imaging device 39a1 is located on the optical axis LX of the photographing optical system 67, the location relation between the movable unit 30a and the fixed unit 30b is set up so that the imaging field IF is located at the center of its movement range R1 in both the first direction x and the second direction y.

A rectangle shape, which forms the imaging surface (the valid pixel area) of the imaging device 39a1, and which is the imaging field IF, has two diagonal lines. In the embodiment, the center of the imaging field IF is the crossing point of these two diagonal lines.

In the embodiment, the center of the imaging field IF agrees with the center of gravity of the rectangle shape of the valid pixel area. Accordingly, when the movable unit 30a is located at the center of its movement range R1, the center of gravity of the rectangle shape of the valid pixel area is located on the optical axis LX of the photographing optical system 67.

The CPU 21 recognizes the first imaging position SS1 of the first photography frame F1, the second imaging position SS2 of the second photography frame F2, the third imaging position SS3 of the third photography frame F3, and the fourth imaging position SS4 of the fourth photography frame F4, as the movement quantity both in the first direction x and the second direction y from the center of the movable unit 30a's movement range, based on pixel units. For example, the CPU 21 recognizes that a number of pixels between the first imaging position SS1 and the center of the movable unit 30a's movement range both in the first direction x and the second direction y.

Further, the CPU 21 recognizes the overlapping areas between the imaging field IF at the first position S1 and the first photography frame F1, between the imaging field IF at the second position S2 and the second photography frame F2, between the imaging field IF at the third position S3 and the third photography frame F3, and between the imaging field IF at the fourth position S4 and the fourth photography frame F4, by a pixel unit.

Moving the movable unit 30a in the first direction x is performed by using a first electro-magnetic force.

Moving the movable unit 30a in the second direction y is performed by using a second electro-magnetic force.

The first electro-magnetic force occurs on the basis of the current direction of the first coil 31a and the magnetic-field direction of the first magnet 411b.

The second electromagnetic force occurs on the basis of the current direction of the second coil 32a and the magnetic-field direction of the second magnet 412b.

The imaging unit 39a, the plate 64a, and the movable circuit board 49a are attached, in this order along the optical axis LX direction, viewed from the side of the photographing optical system 67. The imaging unit 39a has an imaging device 39a1, a stage 39a2, a holding unit 39a3, and an optical low-pass filter 39a4. The stage 39a2 and the plate 64a hold and urge the imaging device 39a1, the holding unit 39a3, and the optical low-pass filter 39a4 in the optical axis LX direction.

The first, second, and third bearing units for horizontal movement 51a, 52a, and 53a are attached to the stage 39a2. The imaging device 39a1 is attached to the plate 64a, so that positioning of the imaging device 39a1 is performed where the imaging device 39a1 is perpendicular to the optical axis LX of the photographing optical system 67. In the case where the plate 64a is made of a metallic material, the plate 64a has the effect of radiating heat from the imaging device 39a1, by contacting the imaging device 39a1.

The imaging device 39a1 is an imaging device in which the accumulated electric charge for a specific part can be read out, such as a CMOS etc.

The first coil 31a and the second coil 32a are attached to the movable circuit board 49a.

The first coil 31a forms a seat and a spiral shape coil pattern. The coil pattern of the first coil 31a has a line segment which is parallel to the second direction y, where the movable unit 30a which includes the first coil 31a, is moved in the first direction x, by the first electromagnetic force. The line segment which is parallel to the second direction y, is used for moving the movable unit 30a in the first direction x. The line segment which is parallel to the second direction y, has a first effective length LE1.

The second coil 32a forms a seat and a spiral shape coil pattern. The coil pattern of the second coil 32a has a line segment which is parallel to the first direction x, where the movable unit 30a which includes the second coil 32a, is moved in the second direction y, by the second electromagnetic force. The line segment which is parallel to the first direction x, is used for moving the movable unit 30a in the second direction y. The line segment which is parallel to the first direction x, has a second effective length LE2.

The first and second coils 31a and 32a are connected with the driver circuit 29 which drives the first and second coils 31a and 32a through the flexible circuit board (not depicted). The first PWM duty dx is input to the driver circuit 29 from the PWM 0 of the CPU 21, and the second PWM duty dy is input to the driver circuit 29 from the PWM 1 of the CPU 21. The driver circuit 29 supplies power to the first coil 31a corresponding to the value of the first PWM duty dx, and to the second coil 32a corresponding to the value of the second PWM duty dy, to drive the movable unit 30a.

The first magnet 411b is attached to the movable unit side of the fixed unit 30b, where the first magnet 411b faces the first coil 31a in the third direction z.

The second magnet 412b is attached to the movable unit side of the fixed unit 30b, where the second magnet 412b faces the second coil 32a in the third direction z.

The first magnet 411b is attached to the first yoke 431b, under the condition where the N pole and S pole are arranged in the first direction x. The first yoke 431b is attached to the base board 65b of the fixed unit 30b, on the side of the movable unit 30a, in the third direction z.

The length of the first magnet 411b in the second direction y, is longer in comparison with the first effective length LE1 of the first coil 31a. The magnetic-field which influences the first coil 31a, is not changed during movement of the movable unit 30a in the second direction y.

The second magnet 412b is attached to the second yoke 432b, under the condition where the N pole and S pole are arranged in the second direction y. The second yoke 432b is attached to the base board 65b of the fixed unit 30b, on the side of the movable unit 30a, in the third direction z.

The length of the second magnet 412b in the first direction x, is longer in comparison with the second effective length LE2 of the second coil 32a. The magnetic-field which influences the second coil 32a, is not changed during movement of the movable unit 30a in the first direction x.

The first yoke 431b is made of a soft magnetic material, and forms a square-u-shape channel when viewed from the second direction y. The first magnet 411b and the first coil 31a are inside the channel of the first yoke 431b.

The side of the first yoke 431b, which contacts the first magnet 411b, prevents the magnetic-field of the first magnet 411b from leaking to the surroundings.

The other side of the first yoke 431b (which faces the first magnet 411b, the first coil 31a, and the movable circuit board 49a) raises the magnetic-flux density between the first magnet 411b and the first coil 31a.

The second yoke 432b is made of a soft magnetic material, and forms a square-u-shape channel when viewed from the first direction x. The second magnet 412b and the second coil 32a are inside the channel of the second yoke 432b.

The side of the second yoke 432b, which contacts the second magnet 412b, prevents the magnetic-field of the second magnet 412b from leaking to the surroundings.

The other side of the second yoke 432b (which faces the second magnet 412b, the second coil 32a, and the movable circuit board 49a) raises the magnetic-flux density between the second magnet 412b and the second coil 32a.

The base board 65b is a plate state member which becomes the base for attaching the first yoke 431b etc., and is arranged being parallel to the imaging surface of the imaging device 39a1.

Figure 15:
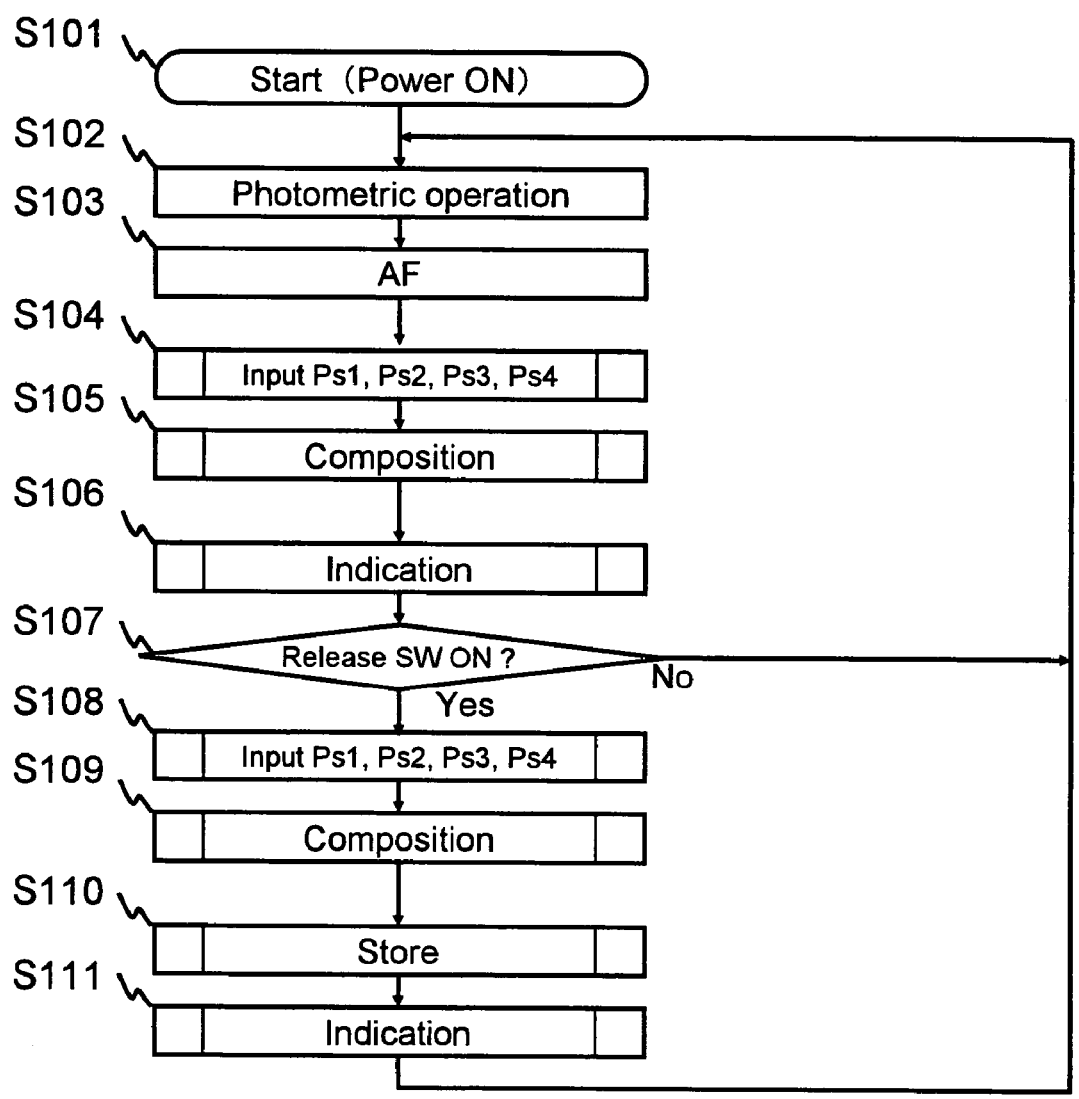
FIG. 15 is a flowchart of the imaging operation in the embodiment.

Next, the flow of the imaging operation (the flow of the operation of the CPU 21) is explained by using the flowchart in FIG. 15.

In step S101, the Pon switch 11a is set to the on state (power on), so that the power of the photographing apparatus 1 is set to the on state. In step S102, the photometric operation is performed by driving an AE sensor of the AE unit 23, so that the aperture value and the time length of the exposure time are calculated. In step S103, the AF sensing operation is performed by driving an AF sensor of the AF unit 24, so that the focusing operation is performed by driving a lens control circuit of the AF unit 24.

In step S104, the first image signal Ps1 is input to and temporally stored in the CPU 21 (the first imaging operation), the second image signal Ps2 is input to and temporally stored in the CPU 21 (the second imaging operation), the third image signal Ps3 is input to and temporally stored in the CPU 21 (the third imaging operation), and the fourth image signal Ps4 is input to and temporally stored in the CPU 21 (the fourth imaging operation).

In step S105, the first, second, third, and fourth image signals Ps1, Ps2, Ps3, and Ps4 are combined as the anti-shake image signal Pss. This combination includes a making operation for the data of the thinning operation or the compressing operation.

In step S106, the anti-shake image PicS is indicated on the indicating field of the indicating unit 17, in other words the through image is indicated.

In step S107, it is judged whether the release switch 13a is set to the on state by the operator. When the release switch 13a is not set to the on state, the process is returned to step S102, so that the imaging operation is repeated. When the release switch 13a is set to the on state, the first image signal Ps1 is input to and temporally stored in the CPU 21 (the first imaging operation), the second image signal Ps2 is input to and temporally stored in the CPU 21 (the second imaging operation), the third image signal Ps3 is input to and temporally stored in the CPU 21 (the third imaging operation), and the fourth image signal Ps4 is input to and temporally stored in the CPU 21 (the fourth imaging operation), in step S108.

In step S109, the first, second, third, and fourth image signals Ps1, Ps2, Ps3, and Ps4 are combined as the anti-shake image signal Pss. This combination includes a making operation for the data of the thinning operation or the compressing operation.

In step S109, the anti-shake image signal Pss is stored in the memory 18.

In step S110, the anti-shake image PicS is indicated on the indicating field of the indicating unit 17, in other words the image which is imaged and stored, is indicated.

Figure 16:
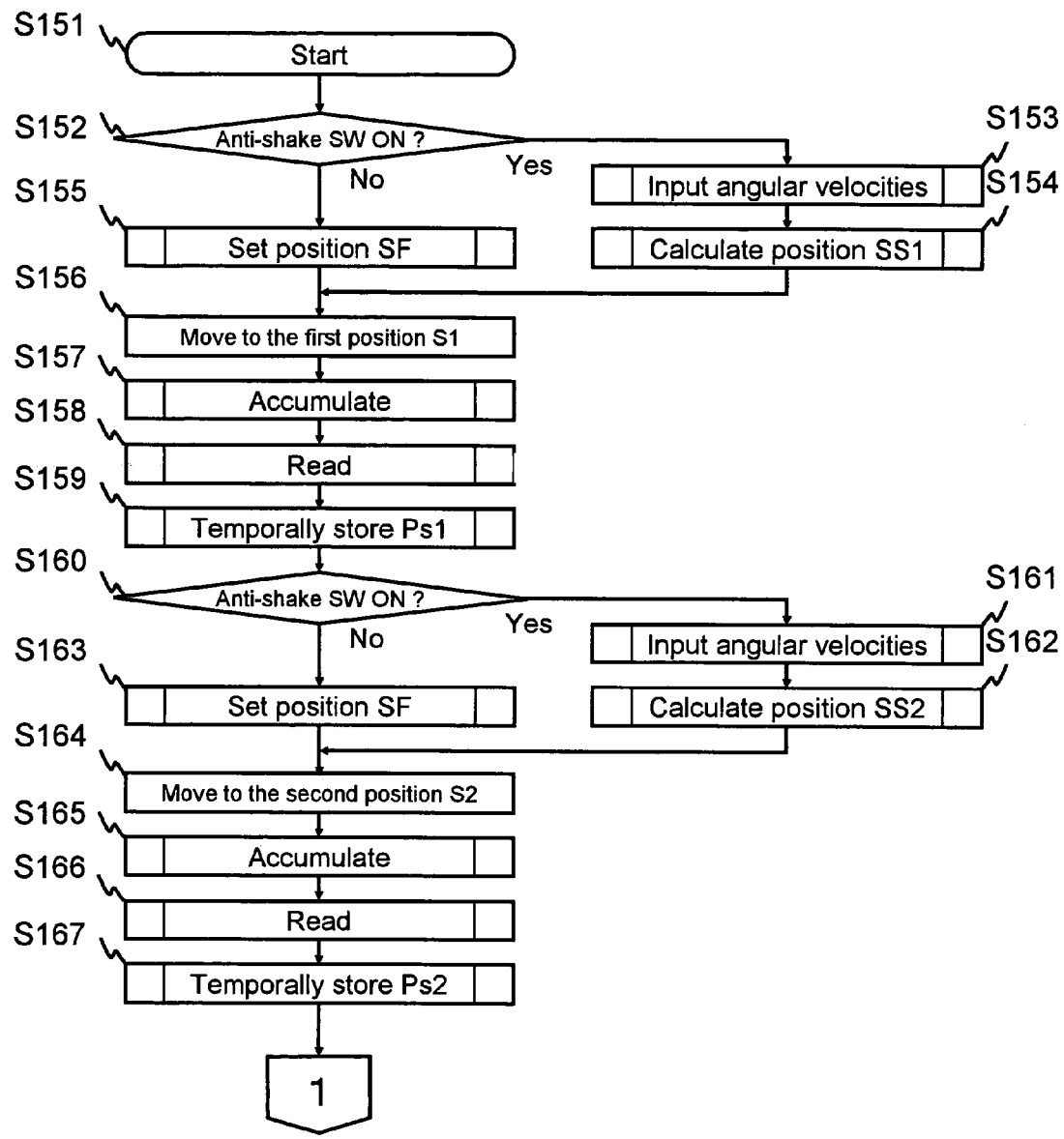
FIG. 16 is a first part of a flowchart of the first, second, third, and fourth imaging operations.
Figure 17:
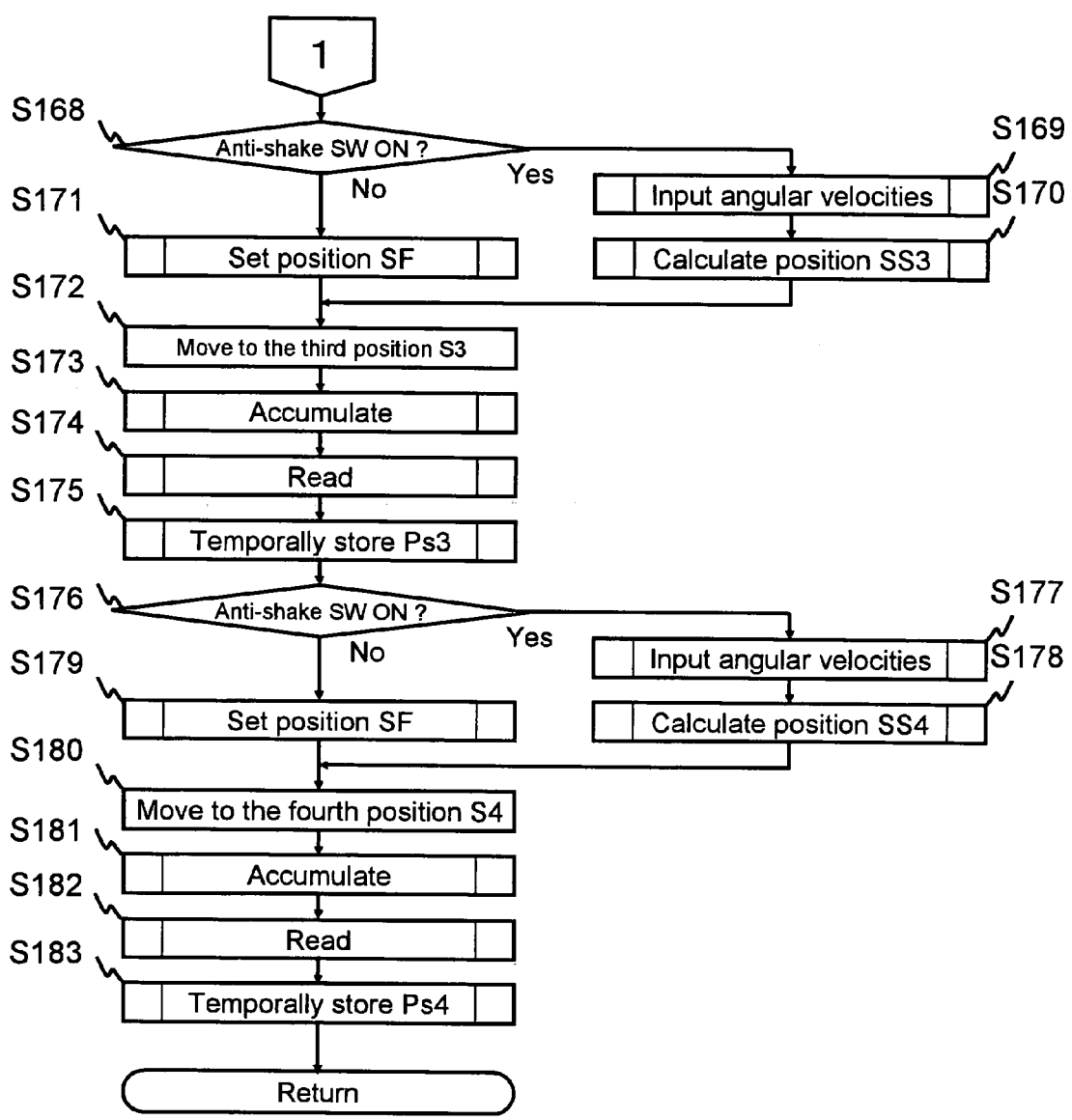
FIG. 17 is a second part of a flowchart of the first, second, third, and fourth imaging operations.

Next, the flow of the first, second, third, and fourth imaging operations in steps S104 and S108 of FIG. 17 is explained by using the flowchart in FIGS. 16 and 17.

In step S151, the first imaging operation is started.

In step S152, it is judged whether the anti-shake switch 14a is set to the on state. When the anti-shake switch 14a is set to the on state, the first angular velocity vx, which is output from the angular velocity detecting unit 25, is input to the A/D converter A/D 0 of the CPU 21 and is converted to a digital signal. The second angular velocity vy, which is output from the angular velocity detecting unit 25, is input to the A/D converter A/D 1 of the CPU 21 and is converted to a digital signal, in step S153.

In step S154, the first imaging position SS1 of the first photography frame F1 is calculated on the basis of the hand-shake quantity. The hand-shake quantity is calculated on the basis of the first and second angular velocities vx and vy which are detected in step S153.

When the anti-shake switch 14a is not set to the on state, the position S of the photography F is set to the centered position SF of the centered photography frame FF, in step S155. In step S156, the movable unit 30a is moved to the first position S1. In step S157, the electric charge is accumulated in the imaging device 39a1. In step S158, the electric charge, which is accumulated in the imaging device 39a1, is read. In step S159, the electric signal based on the electric charge, which is read, is converted to the first image signal Ps1, and the first image signal Ps1 is temporally stored in the CPU 21, as the first image Pic1 which is imaged. The first imaging operation is then finished.

When the anti-shake switch 14a is set to the on state, the first image signal Ps1 is the image signal which is imaged at the overlapping area between the imaging field IF at the first position S1 and the first photography frame F1.

When the anti-shake switch 14a is not set to the on state, the first image signal Ps1 is the image signal which is imaged at the overlapping area between the imaging field IF at the first position S1 and the centered photography frame FF.

After the first imaging operation has finished, the second imaging operation is started.

In step S160, it is judged whether the anti-shake switch 14a is set to the on state. When the anti-shake switch 14a is set to the on state, the first angular velocity vx, which is output from the angular velocity detecting unit 25, is input to the A/D converter A/D 0 of the CPU 21 and is converted to a digital signal. The second angular velocity vy, which is output from the angular velocity detecting unit 25, is input to the A/D converter A/D 1 of the CPU 21 and is converted to a digital signal, in step S161.

In step S162, the second imaging position SS2 of the second photography frame F2 is calculated on the basis of the hand-shake quantity. The hand-shake quantity is calculated on the basis of the first and second angular velocities vx and vy which are detected in step S161.

When the anti-shake switch 14a is not set to the on state, the position S of the photography F is set to the centered position SF of the centered photography frame FF, in step S163. In step S164, the movable unit 30a is moved to the second position S2. In step S165, the electric charge is accumulated in the imaging device 39a1. In step S166, the electric charge, which is accumulated in the imaging device 39a1, is read. In step S167, the electric signal based on the electric charge, which is read, is converted to the second image signal Ps2, and the second image signal Ps2 is temporally stored in the CPU 21, as the second image Pic2 which is imaged. The second imaging operation is then finished.

When the anti-shake switch 14a is set to the on state, the second image signal Ps2 is the image signal which is imaged at the overlapping area between the imaging field IF at the second position S2 and the second photography frame F2.

When the anti-shake switch 14a is not set to the on state, the second image signal Ps2 is the image signal which is imaged at the overlapping area between the imaging field IF at the second position S2 and the centered photography frame FF.

After the second imaging operation has finished, the third imaging operation is started.

In step S168, it is judged whether the anti-shake switch 14a is set to the on state. When the anti-shake switch 14a is set to the on state, the first angular velocity vx, which is output from the angular velocity detecting unit 25, is input to the A/D converter A/D 0 of the CPU 21 and is converted to a digital signal. The second angular velocity vy, which is output from the angular velocity detecting unit 25, is input to the A/D converter A/D 1 of the CPU 21 and is converted to a digital signal, in step S169.

In step S170, the third imaging position SS3 of the third photography frame F3 is calculated on the basis of the hand-shake quantity. The hand-shake quantity is calculated on the basis of the first and second angular velocities vx and vy which are detected in step S169.

When the anti-shake switch 14a is not set to the on state, the position S of the photography F is set to the centered position SF of the centered photography frame FF, in step S171. In step S172, the movable unit 30a is moved to the third position S3. In step S173, the electric charge is accumulated in the imaging device 39a1. In step S174, the electric charge, which is accumulated in the imaging device 39a1, is read. In step S175, the electric signal based on the electric charge, which is read, is converted to the third image signal Ps3, and the third image signal Ps3 is temporally stored in the CPU 21, as the third image Pic3 which is imaged. The third imaging operation is then finished.

When the anti-shake switch 14a is set to the on state, the third image signal Ps3 is the image signal which is imaged at the overlapping area between the imaging field IF at the third position S3 and the third photography frame F3.

When the anti-shake switch 14a is not set to the on state, the third image signal Ps3 is the image signal which is imaged at the overlapping area between the imaging field IF at the third position S3 and the centered photography frame FF.

After the third imaging operation has finished, the fourth imaging operation is started.

In step S176, it is judged whether the anti-shake switch 14a is set to the on state. When the anti-shake switch 14a is set to the on state, the first angular velocity vx, which is output from the angular velocity detecting unit 25, is input to the A/D converter A/D 0 of the CPU 21 and is converted to a digital signal. The second angular velocity vy, which is output from the angular velocity detecting unit 25, is input to the A/D converter A/D 1 of the CPU 21 and is converted to a digital signal, in step S177.

In step S178, the fourth imaging position SS4 of the third photography frame F4 is calculated on the basis of the hand-shake quantity. The hand-shake quantity is calculated on the basis of the first and second angular velocities vx and vy which are detected in step S177.

When the anti-shake switch 14a is not set to the on state, the position S of the photography F is set to the centered position SF of the centered photography frame FF, in step S179. In step S180, the movable unit 30a is moved to the fourth position S4. In step S181, the electric charge is accumulated in the imaging device 39a1. In step S182, the electric charge, which is accumulated in the imaging device 39a1, is read. In step S183, the electric signal based on the electric charge, which is read, is converted to the fourth image signal Ps4, and the fourth image signal Ps4 is temporally stored in the CPU 21, as the fourth image Pic4 which is imaged. The fourth imaging operation is then finished, and the process is forwarded to step S105 or step S109 in FIG. 15.

When the anti-shake switch 14a is set to the on state, the fourth image signal Ps4 is the image signal which is imaged at the overlapping area between the imaging field IF at the fourth position S4 and the fourth photography frame F4.

When the anti-shake switch 14a is not set to the on state, the fourth image signal Ps4 is the image signal which is imaged at the overlapping area between the imaging field IF at the fourth position S4 and the centered photography frame FF.

In the embodiment, the image signals (Ps1, Ps2, Ps3, and Ps4) are combined for obtaining the anti-shake image signal Pss and anti-shake image PicS, during the anti-shake operation. However, the image quality of the anti-shake image PicS from this combination does not fall, and an angle of view is not narrowed, in comparison with when the imaging operation is performed by using all of the imaging field of the imaging device.

It is explained that the first position S1 is a position where the movable unit 30a contacts the first corner edge point pe1. In this case, the movable unit 30a is driven by the driving force D to where the movable unit 30a contacts the first corner edge point pe1, so that the movable unit 30a can reach the first position S1. The value of this driving force D can be determined in advance, considering an effect of gravity and the characteristics of each member etc. and changes according to the way the photographing apparatus 1 is held. Accordingly, the process for calculating the driving force D for moving to the first position S1, and the process for detecting the first position S1 to be moved to, can be omitted. This is similar for those of the second, third, and fourth positions S2, S3, and S4.

Further, it is explained that the first and second magnets 411b and 412b are attached to the fixed unit 30b, however the magnets may be attached to the movable unit.

The magnet which generates a magnetic-field, may be a permanent magnet which always generates the magnetic-field, or an electric magnet which generates the magnetic-field when it is needed.

Further, moving the movable unit 30a is not limited by the electromotive force by the coil and the magnet.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2004-195239 (filed on Jul. 1, 2004), which is expressly incorporated herein by reference, in its entirety.

The invention claimed is:

1. An anti-shake apparatus of a photographing apparatus, comprising:
 a hand-shake quantity detecting unit that detects first, second, third, and fourth information regarding hand-shake of said photographing apparatus;
 a movable unit that has an imaging device which can be moved in first and second directions, said first direction being perpendicular to an optical axis of a photographing optical system of said photographing apparatus, and said second direction being perpendicular to said first direction and said optical axis;
 a fixed unit that slidably supports said movable unit in said first and second directions; and
 a control apparatus that moves said movable unit to first, second, third, and fourth positions in said movable unit's movement range, and that performs a first imaging operation for obtaining a first image signal, a second imaging operation for obtaining a second image signal, a third imaging operation for obtaining a third image signal, and a fourth imaging operation for obtaining a fourth image signal, and a combination operation for obtaining an anti-shake image signal in which lag from hand-shake is corrected;
 in said first imaging operation, said first information being detected and input to said control apparatus, a first hand-shake quantity being calculated from said first information, a first imaging position of a first photography frame in which lag corresponding to said first hand-shake quantity is corrected, being calculated on the basis of said first hand-shake quantity, and said first image signal which is imaged at an overlapping area between an imaging field of said imaging device at said first position and said first photography frame, being obtained;
 in said second imaging operation, said second information being detected and input to said control apparatus, a second hand-shake quantity being calculated from said second information, a second imaging position of a second photography frame in which lag corresponding to said second hand-shake quantity is corrected, being calculated on the basis of said second hand-shake quantity, and said second image signal which is imaged at an overlapping area between said imaging field at said second position and said second photography frame, being obtained;
 in said third imaging operation, said third information being detected and input to said control apparatus, a third hand-shake quantity being calculated from said third information, a third imaging position of a third photography frame in which lag corresponding to said third hand-shake quantity is corrected, being calculated on the basis of said third hand-shake quantity, and said third image signal which is imaged at an overlapping area between said imaging field at said third position and said third photography frame, being obtained;
 in said fourth imaging operation, said fourth information being detected and input to said control apparatus, a fourth hand-shake quantity being calculated from said fourth information, a fourth imaging position of a fourth photography frame in which lag corresponding to said fourth hand-shake quantity is corrected, being calculated on the basis of said fourth hand-shake quantity, and said fourth image signal which is imaged at an overlapping area between said imaging field at said fourth position and said fourth photography frame, being obtained; and
 in said combination operation, said anti-shake image signal being obtained by combining said first, second, third, and fourth image signals.

2. The anti-shake apparatus according to claim 1, wherein said first position is where said movable unit contacts a first corner edge point which is one of two corner edge points of said movable unit's movement range in said first direction, and is one of two corner edge points of said movable unit's movement range in said second direction;
 said second position is where said movable unit contacts a second corner edge point which is another of two corner edge points of said movable unit's movement range in said first direction, and is one of two corner edge points of said movable unit's movement range in said second direction;
 said third position is where said movable unit contacts a third corner edge point which is another of two corner edge points of said movable unit's movement range in said first direction, and is another of two corner edge points of said movable unit's movement range in said second direction; and
 said fourth position is where said movable unit contacts a fourth corner edge point which is one of two corner edge points of said movable unit's movement range in said first direction, and is another of two corner edge points of said movable unit's movement range in said second direction.

3. The anti-shake apparatus according to claim 2, wherein an order of said movable unit's movement to said first, second, third, and fourth positions is right-handed or left-handed viewed from a third direction which is parallel to said optical axis.

4. The anti-shake apparatus according to claim 1, wherein one of said movable unit and said fixed unit has a first coil which is used for moving said movable unit in said first direction, and has a second coil which is used for moving said movable unit in said second direction; and
 another of said movable unit and said fixed unit has a first magnet which is used for moving said movable unit in said first direction, and has a second magnet which is used for moving said movable unit in said second direction.

5. The anti-shake apparatus according to claim 1, wherein said imaging device can partly read out an accumulated electric charge, and said first, second, third, and fourth image signals are obtained on the basis of the accumulated electric charge which is read out for the part of the imaging field which is needed for the combination.

6. The anti-shake apparatus according to claim 1, wherein a movement range of said imaging field is inside an image circle which is equal to an imaging range of the light through said photographing optical system.

7. The anti-shake apparatus according to claim 1, wherein said first imaging position of said first photography frame is calculated before said movable unit is moved to said first position;
 said second imaging position of said second photography frame is calculated before said movable unit is moved to said second position;
 said third imaging position of said third photography frame is calculated before said movable unit is moved to said third position; and said fourth imaging position of said fourth photography frame is calculated before said movable unit is moved to said fourth position.

8. An anti-shake apparatus of a photographing apparatus, comprising:
- a movable unit that has an imaging device, and that can be moved in first and second directions, said first direction being perpendicular to an optical axis of a photographing optical system of said photographing apparatus, and said second direction being perpendicular to said first direction and said optical axis;
- a fixed unit that slidably supports said movable unit in said first and second directions; and
- a control apparatus that moves said movable unit to first, second, third, and fourth positions, and that performs first, second, third, and fourth imaging operations, and a combination operation;
- in said first imaging operation, a first imaging position of a first photography frame in which lag corresponding to a first hand-shake quantity is corrected, being calculated, and a first image signal which is imaged at an overlapping area between an imaging field of said imaging device at said first position and said first photography frame, being obtained;
- in said second imaging operation, a second imaging position of a second photography frame in which lag corresponding to a second hand-shake quantity is corrected, being calculated, and a second image signal which is imaged at an overlapping area between said imaging field at said second position and said second photography frame, being obtained;
- in said third imaging operation, a third imaging position of a third photography frame in which lag corresponding to a third hand-shake quantity is corrected, being calculated, and a third image signal which is imaged at an overlapping area between said imaging field at said third position and said third photography frame, being obtained;
- in said fourth imaging operation, a fourth imaging position of a fourth photography frame in which lag corresponding to a fourth hand-shake quantity is corrected, being calculated, and a fourth image signal which is imaged at an overlapping area between said imaging field at said fourth position and said fourth photography frame, being obtained; and
- in said combination operation, an anti-shake image signal being obtained by combining said first, second, third, and fourth image signals.

* * * * *